(12) United States Patent
Xia

(10) Patent No.: US 12,159,027 B2
(45) Date of Patent: Dec. 3, 2024

(54) METHOD AND DEVICE FOR CONTROLLING INTERACTIVE WHITE BOARD

(71) Applicants: GUANGZHOU SHIYUAN ELECTRONIC TECHNOLOGY COMPANY LIMITED, Guangzhou (CN); GUANGZHOU SHIZHEN INFORMATION TECHNOLOGY CO., LTD., Guangzhou (CN)

(72) Inventor: Liwei Xia, Guangzhou (CN)

(73) Assignees: GUANGZHOU SHIYUAN ELECTRONIC TECHNOLOGY COMPANY LIMITED, Guangzhou (CN); GUANGZHOU SHIZHEN INFORMATION TECHNOLOGY CO., LTD., Guangzhou (CN)

( * ) Notice: Subject to any disclaimer, the term of this patent is extended or adjusted under 35 U.S.C. 154(b) by 116 days.

(21) Appl. No.: 17/564,151

(22) Filed: Dec. 28, 2021

(65) Prior Publication Data

US 2022/0121354 A1    Apr. 21, 2022

Related U.S. Application Data

(63) Continuation of application No. PCT/CN2019/119997, filed on Nov. 21, 2019.

(30) Foreign Application Priority Data

Oct. 9, 2019  (CN) .......................... 201910955074.3

(51) Int. Cl.
*G06F 3/04842*   (2022.01)
*G06F 3/04847*   (2022.01)
(Continued)

(52) U.S. Cl.
CPC ...... *G06F 3/04847* (2013.01); *G06F 3/04842* (2013.01); *G06F 3/0486* (2013.01); *G06F 2203/04808* (2013.01)

(58) Field of Classification Search
CPC ............. G06F 3/04842; G06F 3/04847; G06F 3/0486; G06F 3/0488; G06F 3/04883; G06F 2203/04808
See application file for complete search history.

(56) References Cited

U.S. PATENT DOCUMENTS 6,012,073 A * 1/2000 Arend .................. G06T 3/0025
715/236
6,459,442 B1  10/2002 Edwards et al.
(Continued)

FOREIGN PATENT DOCUMENTS

CN        103747027 A    4/2014
CN        104391741 A    3/2015
(Continued)

OTHER PUBLICATIONS

International Search Report issued in corresponding international application No. PCT/CN2019/119997, dated Jul. 1, 2020, 3 pages.
(Continued)

*Primary Examiner* — Kavita Stanley
*Assistant Examiner* — William Wong
(74) *Attorney, Agent, or Firm* — BAYES PLLC

(57) ABSTRACT

A control method and device of an interactive white board is provided. The method includes receiving a first selection operation and a first windowing operation on a whiteboard application interface, in response to a handwriting of a first target element overlapping a first sub-window, generating an overlapping part of the handwriting behind the first sub-window, and the first sub-window is displayed in a front of the whiteboard application interface. The method solves the
(Continued)

technical problem in the related art that when some operations are performed in the whole current writing region, and the elements on the screen will move or disappear accordingly, causing inconvenience to the user.

20 Claims, 11 Drawing Sheets

(51) Int. Cl.
*G06F 3/0486* (2013.01)
*G06F 3/04883* (2022.01)

(56) References Cited

U.S. PATENT DOCUMENTS

| | | | | |
|---|---|---|---|---|
| 7,054,473 | B1* | 5/2006 | Roehrig | G16H 50/20 |
| | | | | 382/128 |
| 2006/0274944 | A1* | 12/2006 | Tanaka | G06V 30/1423 |
| | | | | 382/186 |
| 2008/0114844 | A1* | 5/2008 | Sanchez | H04L 67/75 |
| | | | | 709/206 |
| 2009/0235193 | A1 | 9/2009 | Bhatt et al. | |
| 2010/0097341 | A1* | 4/2010 | Iwayama | G06V 40/30 |
| | | | | 345/173 |
| 2010/0162151 | A1* | 6/2010 | Class | G06F 3/04845 |
| | | | | 715/765 |
| 2011/0018827 | A1* | 1/2011 | Wang | G06F 3/04817 |
| | | | | 345/173 |
| 2011/0169756 | A1 | 7/2011 | Ogawa et al. | |
| 2012/0011465 | A1* | 1/2012 | Rezende | G06F 3/0488 |
| | | | | 715/786 |
| 2013/0191768 | A1 | 7/2013 | Thompson et al. | |
| 2014/0085209 | A1 | 3/2014 | Runde et al. | |
| 2014/0359528 | A1 | 12/2014 | Murata | |
| 2014/0380193 | A1* | 12/2014 | Coplen | G06F 3/04847 |
| | | | | 715/753 |
| 2015/0100867 | A1* | 4/2015 | Joo | G06F 3/04886 |
| | | | | 715/203 |
| 2015/0278983 | A1 | 10/2015 | Uefuji | |
| 2016/0140277 | A1* | 5/2016 | Sakata | G06F 30/39 |
| | | | | 716/139 |
| 2016/0148063 | A1* | 5/2016 | Hong | G06V 20/582 |
| | | | | 382/103 |

FOREIGN PATENT DOCUMENTS

| | | |
|---|---|---|
| CN | 108415658 A | 8/2018 |
| CN | 109324745 A | 2/2019 |
| CN | 110045909 A | 7/2019 |
| CN | 110069204 A | 7/2019 |
| JP | 2010250688 A | 11/2010 |
| JP | 2012150638 A | 8/2012 |

OTHER PUBLICATIONS

First Office Action issued in corresponding CN Patent Application No. 201910955074.3, dated Oct. 23, 2020, 8 pages.
First Office Action issued in related Australian Application No. 2019469575, mailed Aug. 17, 2023, 6 pages.
European Search Opinion issued in corresponding European application No. 19948348.8, 4 pages.
First Office Action issued in corresponding Chinese Patent Application No. 201910955074.3, Oct. 23, 2020, 15 pages.
Written Opinion of The International Searching Authority issued in corresponding international application No. PCT/CN2019/119997, Jul. 1, 2020, 4 pages.
Notice of Reasons for Rejection issued in corresponding Japanese application No. JP2022-510894, Mar. 28, 2023, 4 pages.
Examination Report issued in corresponding Indian application No. 202217017558, Feb. 9, 2023, 8 pages.

* cited by examiner

METHOD AND DEVICE FOR CONTROLLING INTERACTIVE WHITE BOARD

CROSS-REFERENCE TO RELATED APPLICATION

The present application is a continuation of International Application No. PCT/CN2019/119997, filed on Nov. 21, 2019, which claims the benefit of priority to Chinese Patent Application No. 201910955074.3, filed on Oct. 9, 2019, both of which are incorporated herein by reference in their entireties.

TECHNICAL FIELD

The present disclosure relates to the field of interactive white boards, for example, to a method and a device for controlling an interactive white board.

BACKGROUND

Interactive white boards are widely used in group interaction occasions such as conferences, teaching, and commercial exhibitions, and integrate multiple functions such as writing, screen projection, and video conferencing. A whiteboard application is software with a high frequency of use of interactive white boards, and in the present disclosure, a user interface presented during the use of the whiteboard application is called the whiteboard application interface. In actual applications, the whiteboard application can be used to acquire user's operation generated by a finger or pen on the whiteboard in the application interface, and acquire multiple control points according to user's operation, and generate user's handwriting based on the control points. And, other multimedia elements can also be inserted on the whiteboard application interface.

A region used for writing, inserting elements, etc. on the whiteboard application interface is called writing region. When the user uses the whiteboard application to show content, if the writing region has a lot of content or the operation location is inconvenient, the user can perform a movement operation on an element in the writing region, this operation is a roaming operation of the element. An initial area of the writing region is set by default to be as large as the display region of the interactive white board. A part of elements may exceed the display region of the interactive white board during the roaming process. In order to contain this part of elements, the area of the writing region will be enlarged accordingly, but this part of elements will still move out of the current display region of the interactive white board, and will no longer be displayed in the current display region. In this case, when the part of elements needs to be combined for exhibition, the user needs to perform the roaming operation many times to move the part of elements in the current region. Moreover, when the user needs to record notes, opinions, outlines, etc. for the part of the elements, the roaming operation needs to be performed again. In addition, when there are multiple writing pages in the whiteboard application, the user can also control the switching of writing pages. After a writing page is switched, the writing page needs to be switched back to show the elements in the writing page. Similarly, when the user needs to combine with elements on the writing page before switching for exhibition, it is also necessary to frequently switch pages during the exhibition process. It can be seen that when the user performs some operations on the writing region or writing page on the whiteboard application interface, the elements on the screen will move or disappear accordingly, causing inconvenience to the user.

Currently, there is no effective solution to the problem in the related art that when the current writing region is operated, an element will move or disappear with the operation, which causes inconvenience to the user.

SUMMARY

Embodiments of the present disclosure provide a method and a device for controlling an interactive white board, so as to at least solve a technical problem in the related art that when some operations are performed in the whole current writing region, the elements on a screen will move or disappear with the operation, which causes inconvenience to the user.

In the first aspect, an embodiment of the present disclosure proposes a method for controlling an interactive white board, including receiving a first selection operation and a first windowing operation on a whiteboard application interface, wherein the whiteboard application interface displays a plurality of elements, the first selection operation is used to select at least one element on the whiteboard application interface as a first target element, and the first windowing operation is used to start at least one first sub-window on the whiteboard application interface; displaying the first target element in the first sub-window; and receiving a writing operation on the whiteboard application interface and generating a handwriting; wherein the first sub-window is displayed in a front of the whiteboard application interface, and the first sub-window is smaller than the whiteboard application interface.

Optionally, the step of receiving the first selection operation and the first windowing operation on the whiteboard application interface includes receiving the first selection operation on the whiteboard application interface, and selecting at least one element as the first target element; displaying a first functional control list after the first target element is selected, wherein the first functional control list is displayed in a preset region of the whiteboard application interface, the first functional control list at least includes a windowing control, and the windowing control is used for a windowing processing; and receiving the first windowing operation that triggers the windowing control, and displaying the first sub-window.

Optionally, the step of receiving the first selection operation and the first windowing operation on the whiteboard application interface includes displaying the whiteboard application interface and a second functional control list, wherein the second functional control list is displayed in a preset region of the whiteboard application interface, the second functional control list at least includes a windowing control; and the windowing control is used for a windowing processing; receiving the first windowing operation that triggers the windowing control, and displaying the first sub-window; and receiving the first selection operation on the whiteboard application interface, and selecting at least one element as the first target element.

Optionally, the first selection operation includes at least one of a circle selection operation and a long-press selection operation.

Optionally, the step of displaying the first target element in the first sub-window includes receiving a first drag operation that acts on the first target element, and copying and displaying the first target element in the first sub-window after the first drag operation drags the first target element to the first sub-window; or receiving a copy operation that acts on the first target element, and displaying the first target element in the first sub-window after receiving a paste operation that acts on the first sub-window.

Optionally, after the step of displaying the first target element in the first sub-window, receiving a second selection operation on the whiteboard application interface, wherein the second selection operation is used to select at least one element on the whiteboard application interface as a second target element; receiving a second drag operation that acts on the second target element; and copying and displaying the second target element in the first sub-window after the second drag operation drags the second target element to the first sub-window.

Optionally, after the step of displaying the first target element in the sub-window, receiving a third selection operation on the whiteboard application interface, wherein the third selection operation is used to select at least one element on the whiteboard application interface as a third target element; receiving a second windowing operation that triggers the windowing control, and displaying a second sub-window, wherein the second sub-window is displayed in a front of the whiteboard application interface, and the second sub-window is smaller than the whiteboard application interface; and copying and displaying the third target element in the second sub-window.

Optionally, displaying the first sub-window includes acquiring a minimum enclosing rectangle of the first target element; acquiring size information of the minimum enclosing rectangle; and generating a first sub-window having the same size information as the minimum enclosing rectangle.

Optionally, if the minimum enclosing rectangle of the first target element is larger than a preset maximum size of the first sub-window, shrinking the target element and then displaying it in the first sub-window.

Optionally, the method further includes receiving a preset operation on the first target element in the first sub-window, and restoring a display of a writing region that contains the first target element on the whiteboard application interface.

Optionally, after the step of displaying the first target element in the first sub-window, the method further includes any one or more of the following—receiving an erasing operation that acts on the first sub-window, and erasing an element in the first sub-window according to an erasing operation; receiving a writing operation that acts on the first sub-window, and generating a handwriting in the first sub-window according to the writing operation; and receiving a movement operation on an element in the first sub-window, moving a display position of the element in the first sub-window according to the movement operation, and expanding an area of a writing region in the first sub-window after the element is moved beyond a display rang of the first sub-window.

Optionally, after the step of displaying the first target element in the first sub-window, receiving a switching operation of writing page, wherein the whiteboard application interface opens a plurality of writing pages, and the switching operation is used to switch writing pages of the whiteboard application interface; and switching a writing page of the whiteboard application interface, and keeping displaying the first sub-window in front of the switched writing page.

Optionally, after the step of displaying the first target element in the first sub-window, receiving an operation of adding new writing pages, wherein the operation of adding new writing pages is used to add a writing page on the whiteboard application interface; and adding a new writing page to the whiteboard application interface, and keeping displaying the first sub-window in front of the newly added writing page.

Optionally, after the step of displaying the first target element in the first sub-window, receiving a movement operation on an element on the whiteboard application interface; moving a display position of the element on the whiteboard application interface, expanding an area of a writing region of the whiteboard application interface after the element is moved beyond a display rang of the interactive white board, and keeping displaying the first sub-window in a front of the whiteboard application interface.

Optionally, the first target element is a handwriting, and after receiving the first selection operation on the whiteboard application interface, the method further includes storing a data sequence of the first target element; displaying the first target element in the first sub-window includes extracting the data sequence of the first target element, and generating the first target element in the first sub-window according to the data sequence.

In a second aspect, an embodiment of the present disclosure proposes a control device of an interactive white board, including a first receiving module, configured to receive a first selection operation and a first windowing operation on a whiteboard application interface, wherein the whiteboard application interface displays a plurality of elements, the first selection operation is used to select at least one element on the whiteboard application interface as a first target element, and the first windowing operation is used to start at least one first sub-window on the whiteboard application interface; a display module, configured to display the first target element in the first sub-window; and a second receiving module, configured to receive a writing operation on the whiteboard application interface, and generate a handwriting; wherein the first sub-window is displayed in a front of the whiteboard application interface, and the first sub-window is smaller than the whiteboard application interface.

In the third aspect, an embodiment of the present disclosure proposes a computer storage medium, wherein the computer storage medium stores a plurality of instructions, and the instructions are adapted to be loaded by a processor to execute steps of the above-mentioned methods.

In a fourth aspect, an embodiment of the present disclosure proposes an interactive white board, including a processor and a memory; wherein the memory stores a computer program, and the computer program is adapted to be loaded by the processor to execute steps of above-mentioned methods.

In the above-mentioned embodiment of the present disclosure, the first selection operation and the first windowing operation on the whiteboard application interface are received, wherein the whiteboard application interface displays a plurality of elements, the first selection operation is used to select at least one element on the whiteboard application interface as a first target element, and the first windowing operation is used to start at least one first sub-window on the whiteboard application interface; the first target element is displayed in the first sub-window; and the writing operation on the whiteboard application interface is received to generate a handwriting, wherein the first sub-window is displayed in a front of the whiteboard application interface, and the first sub-window is smaller than the whiteboard application interface. According to the above solution, a window smaller than the whiteboard application interface is generated according to the windowing operation, so as to display the target element selected by the user, so that the target element in the newly generated window does not move with the user's movement operation of the element on the whiteboard application interface, nor does it switch with the user's switching of the writing page on the whiteboard application interface. Therefore, when the user operates elements or the writing pages, the target element in the newly generated window can be always shown on the whiteboard application interface for continuous exhibition without requiring the user to retrieve it repeatedly, which solves the technical problem in related art that when an operation is performed in the whole current writing region, the elements will move or disappear with the operation which causes inconvenience to the user.

BRIEF DESCRIPTION OF DRAWINGS

Hereinafter, the drawings that need to be used in the description of the embodiments or the related art will be briefly introduced. It goes without saying that the drawings in the following description are only some embodiments of the present disclosure. For those skilled in the art, without creative work, other drawings can also be obtained based on these drawings.

DETAILED DESCRIPTION

Figure 1:
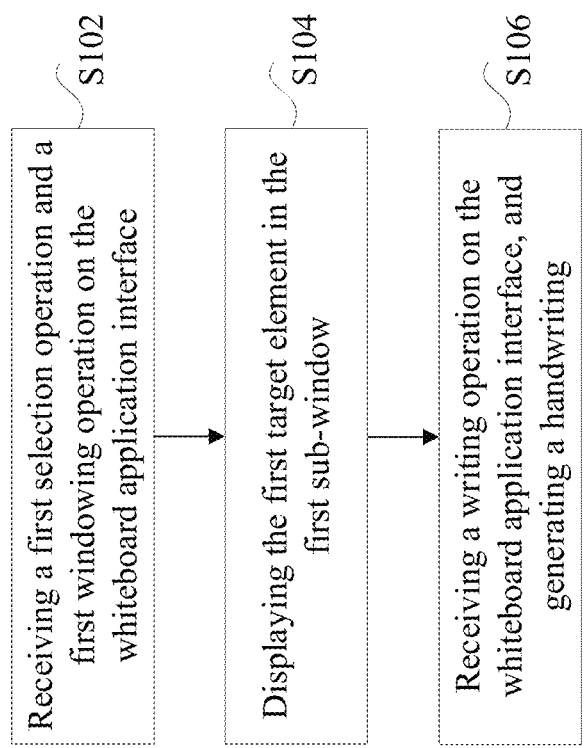
FIG. 1 is a flowchart of a method for controlling an interactive white board according to some embodiments of the present disclosure.

Hereinafter, the embodiments of the present disclosure will be described in further detail with reference to the accompanying drawings.

It should be clear that the described embodiments are only a part of the embodiments of the present disclosure, rather than all of the embodiments.

When the following description refers to the drawings, unless otherwise indicated, the same numbers in different drawings indicate the same or similar elements. The implementation approaches described in the following exemplary embodiments do not represent all implementation approaches consistent with the present disclosure. On the contrary, they are merely examples of devices and methods consistent with some aspects of the present disclosure as detailed in the appended claims.

In the description of the present disclosure, it should be understood that the terms "first," "second," "third," etc. are only used to distinguish similar objects, and not used to describe a specific order or sequence, nor can they be understood as indicating or implying relative importance. For those skilled in the art, the specific meanings of the above-mentioned terms in the present disclosure can be understood according to specific circumstances. In addition, in the description of the present disclosure, unless otherwise specified, "plurality" means two or more, "and/or" describes the association relationship of the associated object, which indicates that there can be three types of relationships, for example, A and/or B can mean: A alone exists, A and B exist at the same time, and B exists alone. The character "I" generally indicates that the associated objects before and after are in an "or" relationship.

The solution proposed in the present disclosure can be applied to an interactive white board. The hardware part of the interactive white board is composed of a display module, an intelligent processing system (including a controller) and other parts, which are combined by the overall structure, and are also supported by a dedicated software system. Thereinto, the display module includes a display screen and a backlight assembly, wherein the display screen includes a transparent conductive layer and a liquid crystal layer, etc.

The display screen, in the embodiments in this description, refers to a finger touch screen, a touchscreen, and a touch panel, which is an inductive liquid crystal display device. When a graphic button on the screen is touched, a tactile feedback system on the screen can drive various connection devices according to pre-programmed programs, which can be used to replace a mechanical button panel, and use a liquid crystal display screen to create vivid audio-visual effect. To distinguish touch screens from technical principles, they can be divided into five basic categories: touch screens with vector pressure sensing technology, touch screens with resistive technology, touch screens with capacitive technology, touch screens with infrared technology, and touch screens with surface acoustic wave technology. According to the working principle of the touch screen and the medium for transmitting information, the touch screen can be divided into four categories: resistive type, capacitive sensing type, infrared type and surface acoustic wave type.

When a user touches a screen with a finger or a pen, a coordinate of a point is located, so as to realize a control of the intelligent processing system, and then realize different functional applications with built-in software of an intelligent processing system.

The "touchscreen" and "screen" mentioned in the present disclosure all refer to the display screen of the interactive white board. Displaying an interface on the interactive white board means that the interface is displayed on the display screen of the interactive white board.

The following Embodiment 1 of the present disclosure provides a method for controlling an interactive white board.

Embodiment 2 provides another method for controlling an interactive white board.

Embodiment 3 provides another method for controlling an interactive white board.

Embodiment 4 provides another method for controlling an interactive white board.

Embodiment 5 provides a control device of an interactive white board.

Embodiment 6 provides a computer storage medium.

Embodiment 7 provides an interactive white board. It should be noted that due to space limitations, the description of the present disclosure does not exhaust all alternative implementation approaches. After reading the description of the present disclosure, those skilled in the art should be able to think that as long as the technical features are not inconsistent with each other, any combination of the technical features can constitute an alternative implementation approach.

For example, in an implementation approach of Embodiment 1, a technical feature is described as: the first windowing operation is used to start at least one first sub-window on the whiteboard application interface, and in another implementation approach of Embodiment 1, another technical feature is described as: receiving a second windowing operation that triggers the windowing control, and displaying a second sub-window. Since the above two technical features are not contradictory to each other, after reading the description of the present disclosure, those skilled in the art should be able to think of that the implementation approach with these two features at the same time is also an alternative implementation approach, that is, both displaying the first sub-window on the whiteboard application interface according to the first windowing operation, and displaying the second sub-window on the whiteboard application interface according to the second windowing operation.

The non-contradictory technical features described in the different embodiments can also be combined arbitrarily to form an alternative implementation approach.

For example, it is described in Embodiment 4 that: receiving an erasing operation that acts on the first sub-window, and erasing an element in the first sub-window according to the erasing operation. In order to control the length of the description of the present disclosure, in Embodiment 1, Embodiment 2 and Embodiment 3, this feature is not described. However, after reading the description of the present disclosure, those skilled in the art should be able to think that the method for controlling the interactive white board provided in Embodiment 1, Embodiment 2 and Embodiment 3 may also include this feature, that is, receiving an erasing operation that acts on the first sub-window, and erasing an element in the first sub-window according to the erasing operation.

Hereinafter, Embodiment 1, Embodiment 2, Embodiment 3, Embodiment 4, Embodiment 5, Embodiment 6, and Embodiment 7 will be described in detail.

Embodiment 1

According to embodiments of the present disclosure, an embodiment of a method for controlling an interactive white board is provided. It should be noted that the steps shown in the flowchart of the accompanying drawings can be executed in a computer system such as a set of computer-executable instructions. And, although a logical sequence is shown in the flowchart, in some cases, the steps shown or described may be performed in a different order from those herein.

FIG. 1 is a flowchart of a method for controlling an interactive white board according to an embodiment of the present disclosure. As shown in FIG. 1, the method includes the following steps:

Step S102, receiving a first selection operation and a first windowing operation on the whiteboard application interface, wherein the whiteboard application interface displays a plurality of elements, the first selection operation is used to select at least one element on the whiteboard application interface as a first target element, and the first windowing operation is used to start at least one first sub-window on the whiteboard application interface.

As mentioned above, the whiteboard application refers to an application for users to perform operations such as write, demonstrate, etc., and the whiteboard application interface refers to a user interface presented during the use of the whiteboard application. The whiteboard application interface can be used to generate a handwriting based on user's writing trajectory on the whiteboard application interface, and can also be used to insert graphics, pictures, tables and other multimedia elements on the whiteboard application interface. On the whiteboard application interface, users can implement operations similar to a physical blackboard such as writing, drawing, and erasing, and can have better digital functions such as moving, saving, zooming, inserting pictures, color adjustment, and stroke thickness setting. The writing-based operation in the whiteboard application is the realization of related technologies, and will not be described in detail in this solution. In practice, the whiteboard application can also be named as whiteboard writing application, writing application, electronic whiteboard application, collaborative whiteboard application, etc. No matter how the name is changed, as long as an application is used to realize the above functions, it is equivalent to the whiteboard application of the present disclosure.

The multiple elements displayed on the above-mentioned whiteboard application interface may include handwritings written by users, and may also include other inserted elements, such as pictures, tables, or various shapes of graphics.

The first selection operation can be an operation generated by clicking, sliding and other actions on the writing page of the whiteboard after the user triggers a "selection" control on the whiteboard, or can be an operation triggered by a circle selection operation or long-press operation directly on the whiteboard. A target element selected by the selection operation can include a handwriting, and can also include other elements inserted in the whiteboard such as pictures, tables, or graphics.

The first windowing operation can be set with multiple triggering manners. For example, the first windowing operation can be performed by triggering a designated control on the whiteboard application interface, or the windowing operation can be performed by a preset multi-finger operation. It goes without saying that there are also other triggering manners, which is not enumerated herein.

In an alternative embodiment, the user may select an element that is expected to be continuously shown as the first target element. For example, taking an educational scenario as an example, if a teacher explains a formula when using the whiteboard for teaching, the teacher can select the explained formula as the target element. Also, taking a conference scenario as an example, a speaker can select a picture of a product as the first target element when using the whiteboard to introduce the product.

Step 104, displaying the first target element in the first sub-window, wherein the first sub-window is displayed in a front of the whiteboard application interface, and the first sub-window is smaller than the whiteboard application interface.

The above-mentioned first sub-window can be placed on top and floated on the current whiteboard application interface, that is, its display priority is higher than that of the whiteboard application interface, and also higher than other elements on the whiteboard application interface, so as to maintain a normal exhibition. Moreover, a size of the above-mentioned first sub-window is smaller than that of the current whiteboard application interface. Optionally, an aspect ratio of the first sub-window can be the same as that of the whiteboard application interface, and the first sub-window is filled with the whiteboard application with specified functions. Compared with the whiteboard application installed in the device itself, the whiteboard application filled in the first sub-window can simplify some complex functions, and only retain the basic functions, such as writing, erasing, roaming and other functions.

Figure 2:
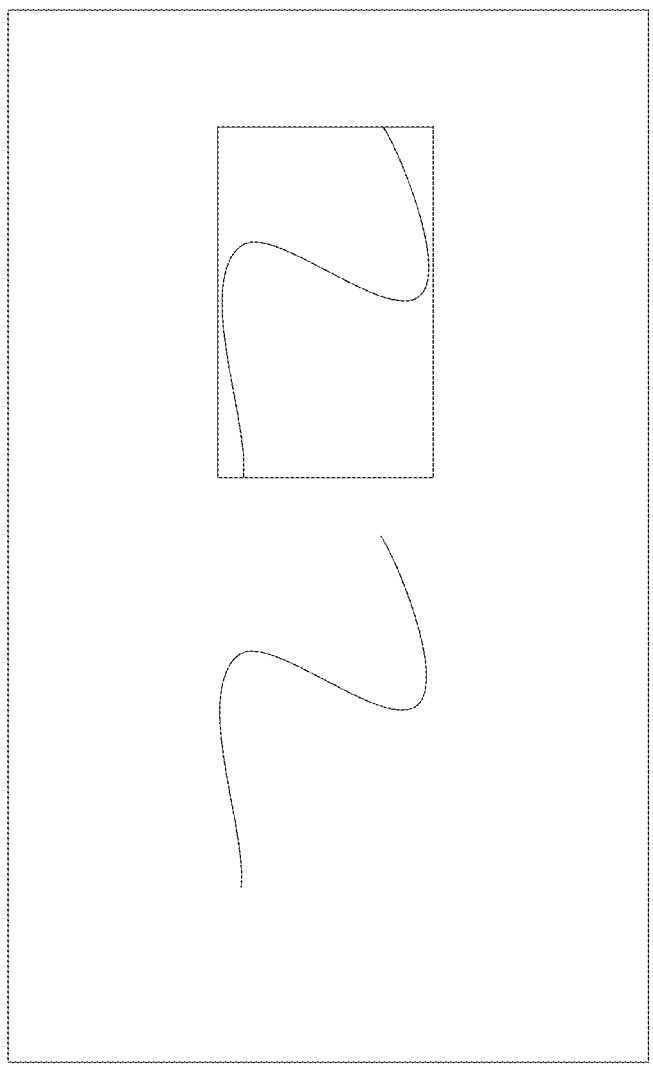
FIG. 2 is a schematic diagram of generating a first sub-window and displaying a target element in the first sub-window according to some embodiments of the present disclosure.

FIG. 2 is a schematic diagram of generating a first sub-window and displaying a target element in the first sub-window according to an embodiment of the present disclosure. As shown in combination with FIG. 2, in the example of FIG. 2, the first sub-window is displayed in a blank region of the whiteboard application interface. In some embodiments, the first sub-window may also be displayed in the middle and other positions of the current display interface of the whiteboard, and the default display position of the first sub-window may be determined according to actual needs. After the first sub-window is displayed in the default display position, the display position of the first sub-window can also be moved. For example, when the first sub-window blocks other elements that the user needs to show, the user can move the position of the first sub-window, so as to show the elements that need to be shown.

It should be noted that the generated first sub-window can be moved on the current interface of the whiteboard according to user's operation, but when the first sub-window is moved within the whiteboard region, in order to avoid a content of the first sub-window exceeding the boundaries of the whiteboard and affecting an interaction with the window, a movable range of the window can be limited, and it can be bounced back to the nearest boundary when out of bounds. In some embodiments, a drag operation may be performed on the first sub-window through operations such as single-finger touch, multi-finger roaming after selection, and the end of all input information is the end of dragging. At the end of the drag, a negative offset of the left and upper boundaries of the first sub-window relative to the upper left boundary of the whiteboard is calculated (that is, the calculation is performed only when the offset is negative, and the positive value is replaced by 0) and recorded as a vector [left, top], and a positive offset of the right and lower boundaries of the first sub-window relative to the lower right boundary of the whiteboard is calculated (that is, the calculation is performed only when the offset is positive, and the negative value is replaced by 0), and recorded as a vector [right, bottom]. The calculated value is the value of the first sub-window beyond the boundary, and the calculated two sets of vectors are taken inverted respectively and added to obtain the actual offset of the first sub-window. The first sub-window is offset according to the actual offset, and a timeline can be added to the offset process to form a rebound effect.

Step S106, receiving a writing operation on the whiteboard application interface, and generating a handwriting.

The above writing operation is generated on the whiteboard application interface, and is used to generate a handwriting on the whiteboard application interface. The writing operation that occurs on the whiteboard application interface in this embodiment is similar to the overall implementation of the conventional writing operation in the whiteboard application in the related art, and a part can be adaptively adjusted for the first sub-window. For example, if a starting point of a writing trajectory corresponding to a certain writing operation is not within the first sub-window, it is confirmed that the writing operation is valid and the writing trajectory is generated correspondingly. If the writing trajectory overlaps the first sub-window, the overlapping part of the writing trajectory is generated behind the first sub-window, so as to adapt to a pinned front display of the first sub-window. The overlapping part of the writing trajectory can be displayed only after the first sub-window is removed or the writing trajectory is moved. For another example, if the starting point of the writing trajectory corresponding to a certain writing operation is within the first sub-window, it is confirmed that the writing operation is invalid and the writing trajectory is not generated, or it is confirmed that the writing trajectory corresponds to a writing behavior in the first sub-window, and the corresponding writing trajectory is generated in the first sub-window, which can be set according to different application scenarios.

It can be seen from the above solution that although the sub-window in the present disclosure floated above the whiteboard application interface, the whiteboard application interface can still generate a handwriting according to the writing operations thereon, and when the whiteboard application interface generates the handwriting according to the writing operation, the sub-window is still floating above the whiteboard application interface without being blocked by the whiteboard application interface. Therefore, the user can fixedly display the first target element in the first sub-window, and perform operations such as writing in other regions of the whiteboard application interface, so as to realize the interpretation of the first target element. For example, during some conferences and teaching activities, some elements such as a part of handwriting or pictures are fixedly shown as a show focus, at the same time, during the exhibition process, notes, opinions, outlines, etc., are recorded on the whiteboard application interface aiming at the fixed show focus, and finally a complete activity record is generated. Based on the activities carried out by this solution, the presentation of the show focus and the generation of the activity record are realized on the same interface, which can be better shown and explained.

In this embodiment, taking an educational scenario as an example, the teacher explains the formula when using the whiteboard for teaching. The teacher can select the explained formula as the first target element, and the whiteboard application interface generates the first sub-window to display the formula selected by the teacher. Then, even if the teacher performs a movement operation on the element of the current whiteboard application interface, or switches the writing page of the current whiteboard application interface, it will not affect the display of the formula in the first sub-window, so that an exhibition teaching can be performed by continuously combining with the formula displayed in the first sub-window, such as step-by-step explanations, gradual writing operations on the whiteboard application interface, and writing of a derivation process of the selected formula. In addition, taking a conference scenario as an example, when using the whiteboard to introduce a product, a speaker can select a picture of the product as the first target element, and displays the first target element in the first sub-window. Then, even if the speaker performs a movement operation on the element of the current whiteboard application interface, or switches the writing page of the current whiteboard application interface, it will not affect the display of the picture in the first sub-window, which can be performed a normal exhibition. Therefore, during the product introduction process, for the target element, writing exhibition can be performed on the whiteboard application interface in combination with the selected product picture, which includes writing product features, problems, or aspects that need improvement, and other content. In general, this embodiment can combine the functions of the whiteboard application to realize multi-angle exhibition combined with selected product pictures, including writing product characteristics, inserting comparison tables with other products, inserting pictures of other products for comparison, and the like.

It can be seen from this that, the solution in the above-mentioned embodiment of the present disclosure includes: receiving a first selection operation and a first windowing operation on a whiteboard application interface, wherein the whiteboard application interface displays a plurality of elements, and the first selection operation is used to select at least one element on the whiteboard application interface as a first target element, and the first windowing operation is used to start at least one first sub-window on the whiteboard application interface; displaying the first target element in the first sub-window; and receiving a writing operation on the whiteboard application interface, and generating a handwriting, wherein the first sub-window is displayed in a front of the whiteboard application interface, and the first sub-window is smaller than the whiteboard application interface. According to the above solution, a window smaller than the whiteboard application interface is generated according to the windowing operation, so as to display the target element selected by the user, so that the target element in the newly generated window does not move with the user's movement operation of the element on the whiteboard application interface, nor does it switch with the user's switching of the writing page on the whiteboard application interface. Therefore, when the user operates elements or writing pages, the target element in the newly generated window can be always shown on the whiteboard application interface, so that the user can continuous exhibit the target element in combination with the functions of the whiteboard application such as writing and inserting elements, without requiring the user to retrieve it repeatedly, which solves the technical problem in related art that when an operation is performed in the current writing region, elements will move or disappear with the operation, which causes inconvenience to the user. And users can use the functions of the whiteboard application such as writing and inserting elements to perform continuous exhibition of the elements displayed in the window, so as to achieve the focus effect and continuity of the content exhibition.

Embodiment 2

Figure 3:
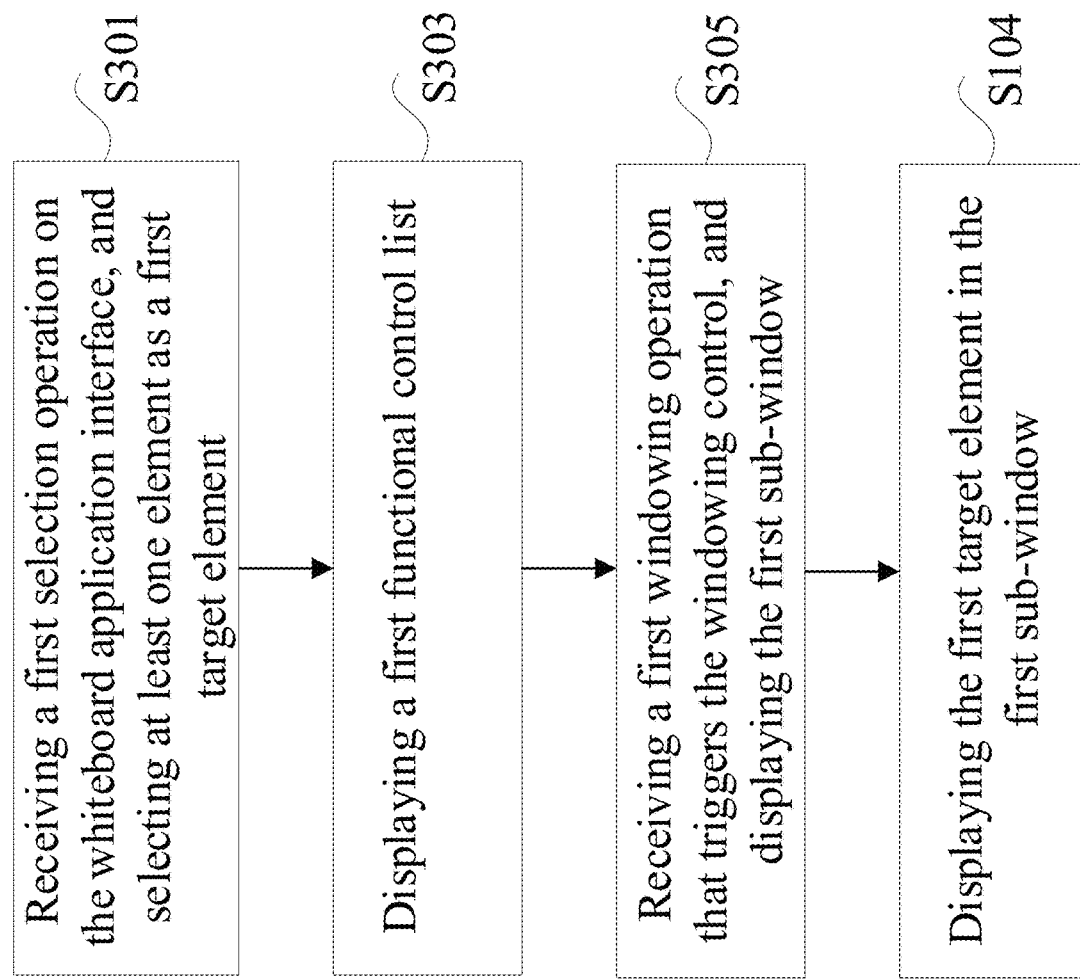
FIG. 3 is a flowchart of another method for controlling an interactive white board according to some embodiments of the present disclosure.

According to embodiments of the present disclosure, an embodiment of a method for controlling an interactive white board is provided. FIG. 3 is a flowchart of another method for controlling an interactive white board in an embodiment of the present disclosure. This embodiment is obtained by making changes based on the above-mentioned embodiment. As shown in FIG. 3, the method includes the following steps:

Step S301, receiving a first selection operation on the whiteboard application interface, and selecting at least one element as a first target element. The whiteboard application interface displays a plurality of elements. The plurality of elements may include a handwriting written by the user, and may also include other inserted elements, such as pictures, tables, or various shapes of graphics.

Step S303, displaying a first functional control list after the first target element is selected, wherein the first functional control list is displayed in a preset region of the whiteboard application interface, the first functional control list at least includes a windowing control, and the windowing control is used for a windowing processing.

The above-mentioned first functional control list is generated after the first selection operation is completed. The display position of the first functional control list can be set according to actual needs, for example, it can be displayed under the selected first target element, or it can be displayed in a fixed position on the entire whiteboard.

Figure 4A:
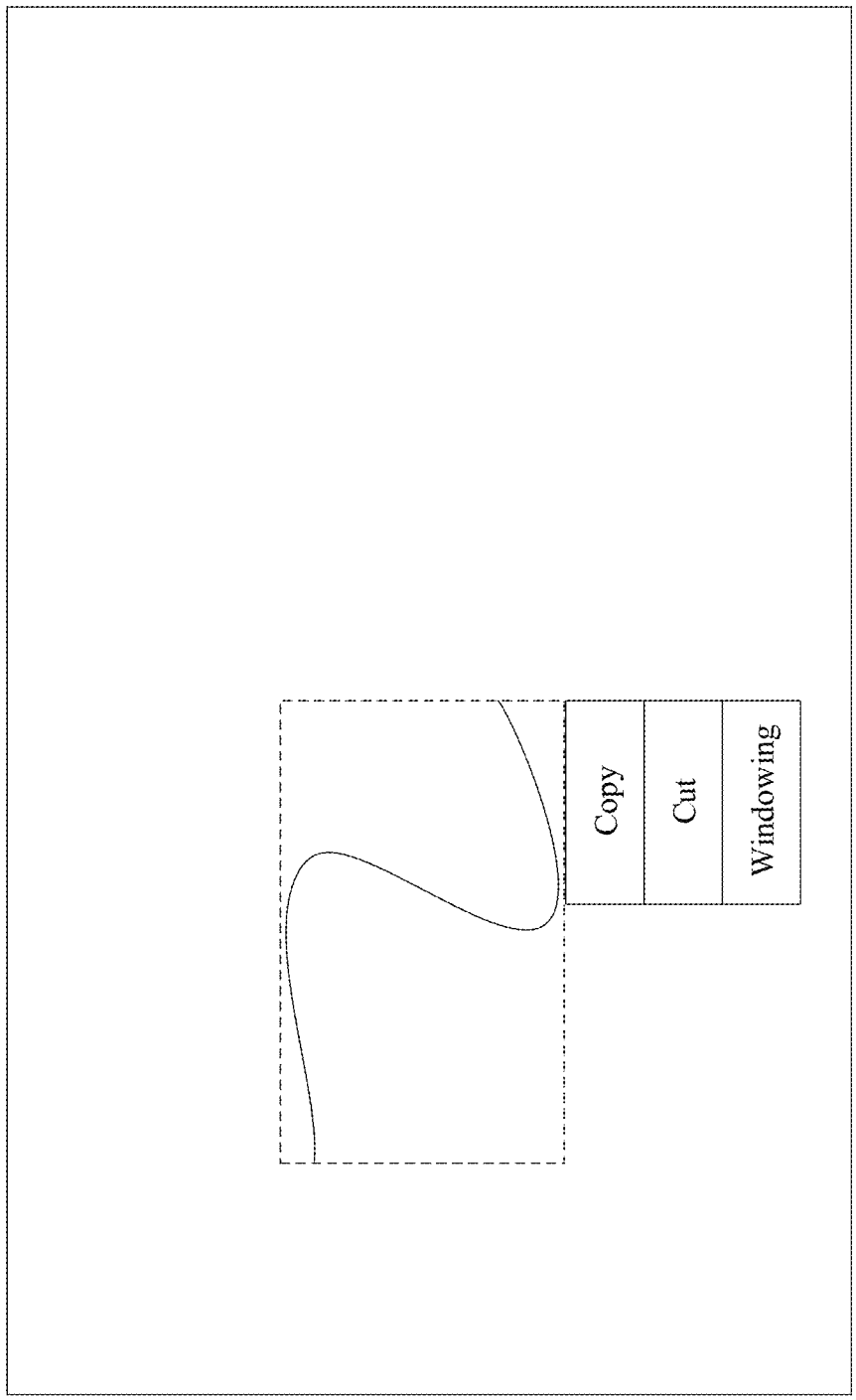
FIG. 4a is a schematic diagram of a first functional control list according to some embodiments of the present disclosure.

FIG. 4a is a schematic diagram of a first functional control list according to an embodiment of the present disclosure. As shown in combination with FIG. 4a, when the user selects an element on the whiteboard application interface, the first functional control list is displayed near the selected first target element. The first functional control list includes operations that are allowed to be performed on the first target element, such as copying, cutting, and windowing. The user clicks on the windowing control to perform the windowing operation.

Step S305, receiving a first windowing operation that triggers the windowing control, and displaying the first sub-window. The operation of triggering the windowing control may be a click operation, etc. When the user triggers the windowing control, the whiteboard application interface receives the user's first windowing operation and displays the first sub-window.

As an alternative embodiment, displaying the first sub-window includes: acquiring a minimum enclosing rectangle of the first target element, acquiring size information of the minimum enclosing rectangle, and generating a first sub-window having the same size information as the minimum enclosing rectangle.

The minimum enclosing rectangle of the first target element is used to indicate the minimum rectangle that can contain the first target element. As shown in combination with FIG. 2, the dashed line surrounding the element is the minimum enclosing rectangle of the preset element.

In the above steps, the first sub-window having the same size information as the minimum enclosing rectangle is generated, that is, the size of the first sub-window is the same as the minimum enclosing rectangle of the first target element.

In an alternative embodiment, still taking FIG. 2 as an example, after the user selects the "windowing" control and performs a windowing operation, a window with the same size as the minimum enclosing rectangle of the first target element is generated, the generated first sub-window is floated and displayed on the whiteboard application interface, and a whiteboard is filled in the generated first window.

As an alternative embodiment, if the minimum enclosing rectangle of the first target element is larger than the preset maximum size of the first sub-window, the target element is shrunk and then displayed in the first sub-window.

It should be noted that the above-mentioned first sub-window is floated and displayed on the whiteboard application interface, but it may not completely cover the whiteboard. Therefore, the maximum size of the above-mentioned first sub-window can be set. If the minimum enclosing rectangle of the first target element is larger than the preset maximum size of the first sub-window, the first target element is shrunk and then displayed in the first sub-window.

When judging whether the minimum enclosing rectangle of the first target element is larger than the preset maximum size of the first sub-window, the height of the minimum enclosing rectangle may be compared with the height of the preset maximum size of the first sub-window, and the width of the minimum enclosing rectangle may be compared with the height of the preset maximum size of the first sub-window, when the height of the minimum enclosing rectangle is larger than that of the preset maximum size of the first sub-window, or the width of the minimum enclosing rectangle is larger than that of the maximum size of the first sub-window, it is confirmed that the minimum enclosing rectangle of the first target element is larger than the preset maximum size of the first sub-window.

When it is determined that the minimum enclosing rectangle of the first target element is larger than the preset maximum size of the first sub-window, the width and height of the preset element are shrunk in equal proportions, and then displayed in the first sub-window. Shrinking the width and height in equal proportions is used to indicate that the width and height of the preset element are shrunk by the same multiple.

Step S104: displaying the first target element in the first sub-window, wherein the first sub-window is displayed in a front of the whiteboard application interface, and the first sub-window is smaller than the whiteboard application interface.

As an alternative embodiment, the first target element is a handwriting, and after receiving the first selection operation on the whiteboard application interface, the method further comprises: storing a data sequence of the first target element, displaying the first target element in the first sub-window, which includes: extracting the data sequence of the first target element, and generating the first target element in the first sub-window according to the data sequence.

In the case where the first target element is a handwriting, the data sequence may include position, size, type, attributes (thickness, color, etc. of the handwriting), dot trajectory data, and the like, which constitute the elements. In the above solution, after the first selection operation is received, the data sequence of the first target element is extracted, and after the first sub-window is generated, the first target element is drawn on the whiteboard in the first sub-window again according to the data sequence. This solution is suitable for the case where the element is a handwriting.

Step S106, receiving a writing operation on the whiteboard application interface, and generating a handwriting.

The above writing operation is generated on the whiteboard application interface, and is used to generate a handwriting on the whiteboard application interface.

The above steps S104 and S106 are the same as the steps S104 and S106 in Embodiment 1, and will not be repeated herein.

It can be seen from the above solution that although the sub-window in the present disclosure is floated above the whiteboard application interface, the whiteboard application interface can still generate a handwriting according to the writing operations thereon, and when the handwriting is generated on whiteboard application interface according to the writing operation, the sub-window is still floating above the whiteboard application interface without being blocked by the whiteboard application interface. Therefore, the user can fixedly display the first target element in the first sub-window, and perform operations such as writing in other regions of the whiteboard application interface, so as to realize the interpretation of the first target element. For example, during some conferences and teaching activities, some elements such as partial handwriting or pictures are fixedly shown as the show focus, at the same time, during the display process, for the show focus fixedly shown, notes, opinions, outlines, etc., are recorded on the whiteboard application interface, and finally a complete activity record is generated. Based on the activities carried out by this solution, the presentation of the show focus and the generation of the activity record are realized on the same interface, which can be better shown and explained.

In this embodiment, taking an educational scenario as an example, the teacher explains the formula when using the whiteboard for teaching. The teacher can select the explained formula as the first target element, and the whiteboard application interface generates the first sub-window to display the formula selected by the teacher. Then, even if the teacher performs a movement operation on the element of the current whiteboard application interface, or switches the writing page of the current whiteboard application interface, it will not affect the display of the formula in the first sub-window, so that an exhibition teaching can be performed by continuously combining with the formula displayed in the first sub-window, such as step-by-step explanations, gradual writing operations on the whiteboard application interface, and writing of a derivation process of the selected formula. In addition, taking a conference scenario as an example, when using a whiteboard to introduce a product, a speaker can select a picture of the product as the first target element, and displays the first target element in the first sub-window. Then, even if the speaker performs a movement operation on the element of the current whiteboard application interface, or switches the writing page of the current whiteboard application interface, it will not affect the display of the picture in the first sub-window, which can be performed a normal exhibition. Therefore, during the product introduction process, for the target element, writing exhibition can be performed on the whiteboard application interface in combination with the selected product picture, which includes writing product features, problems, or aspects that need improvement, and other content. In general, this embodiment can combine the functions of the whiteboard application to realize multi-angle exhibition combined with selected product pictures, including writing product characteristics, inserting comparison tables with other products, inserting pictures of other products for comparison, and the like.

It can be seen from this that, the above-mentioned solution includes: receiving a first selection operation on a whiteboard application interface, selecting at least one element as a first target element, and then displaying a first functional control list after the first target element is selected, wherein the first functional control list is displayed in a preset region of the whiteboard application interface, the first functional control list at least includes a windowing control, and the windowing control is used for a windowing processing; receiving a first windowing operation that triggers the windowing control, and displaying the first sub-window; displaying the first target element in the first sub-window; and receiving the writing operation on the whiteboard application interface, and generating a handwriting, wherein, the first sub-window is displayed in a front of the whiteboard application interface, and the first sub-window is smaller than the whiteboard application interface. According to the above solution, a window smaller than the whiteboard application interface is generated according to the windowing operation, so as to display the target element selected by the user, so that the target element in the newly generated window does not move with the user's movement operation of the element on the whiteboard application interface, nor does it switch with the user's switching of the writing page on the whiteboard application interface. Therefore, when the user operates elements or the writing pages, the target element in the newly generated window can be always shown on the whiteboard application interface, so that the user can continuous exhibit the target element in combination with the functions of the whiteboard application such as writing and inserting elements, without requiring the user to retrieve it repeatedly, which solves the technical problem in related art that when an operation is performed in the current writing region, elements will move or disappear with the operation, which causes inconvenience to the user. And users can use the functions of the whiteboard application such as writing and inserting elements to perform continuous exhibition of the elements displayed in the window, so as to achieve the focus effect and continuity of the content exhibition.

Moreover, the above-mentioned embodiment of the present disclosure generates a sub-window according to the selected target element (that is, the sub-window will not be displayed on the whiteboard application interface until the user selects the target element), and can display quickly the target element selected by the user in the sub-window that is on the whiteboard application interface, which not only does not occupy the display region of the whiteboard application interface at all when the sub-window is not in use, but can also make the sub-window display on the whiteboard application interface through simple and convenient operations when the sub-window is needed, and the operation is very convenient.

As an alternative embodiment, the above-mentioned first selection operation is a circle selection operation and/or a long-press selection operation. In an alternative embodiment, the first selection operation is a circle selection operation, which is used to indicate that a single finger slides on the whiteboard to form a closed or unclosed curved trajectory, and an element included in the trajectory or touched by the trajectory is selected. After receiving the circle selection operation, the whiteboard application interface determines the selected first target element according to the circle selection operation.

In another alternative embodiment, the first selection operation is a long-press selection operation, and the long-press selection operation is an operation in which the duration of staying on an element exceeds a preset duration. After receiving the long-press selection operation, the whiteboard application interface determines the selected first target element according to the long-press selection operation.

In another alternative embodiment, the first selection operation may also be a combined operation composed of a circle selection operation and a long-press selection operation. After the elements are circled, long-press the selection operation is then performed on the circled elements to determine the first target element to be selected.

As an alternative embodiment, after the step of displaying the first target element in the sub-window, the above method further includes:
receiving a second selection operation on the whiteboard application interface, wherein the second selection operation is used to select at least one element on the whiteboard application interface as a second target element,
receiving a second drag operation that acts on the second target element, and
copying and displaying the second target element in the first sub-window after the second drag operation drags the second target element to the first sub-window.

The above-mentioned second selection operation can be of the same type as the first selection operation, which is used to select at least one second target element different from the first target element on the whiteboard application interface. The difference is that the second selection operation is performed after the first sub-window is generated, and can be used to, after the user select an element expected for a fixed exhibition, copy and display the element in the second sub-window. Therefore, the user can select a target element and generate a sub-window for exhibition, and the user can also select other elements to copy to the first sub-window for exhibition during the exhibition process. For example, in a conference scenario, when a user introduces a product, the product picture is first copied to the first sub-window for exhibition, and during the exhibition, the main functions of the product written on the whiteboard application interface is also copied to the first sub-window for exhibition.

As an alternative embodiment, after the step of displaying the first target element in the sub-window, the method further includes: receiving a third selection operation on the whiteboard application interface, wherein the third selection operation is used to select at least one element on the whiteboard application interface as a third target element; receiving a second windowing operation that triggers the windowing control, and displaying a second sub-window, wherein the second sub-window is displayed in a front of the whiteboard application interface, and the second sub-window is smaller than the whiteboard application interface; and copying and displaying the third target element in the second sub-window.

The above-mentioned third selection operation can be of the same type as the first selection operation, which is used to select at least one third target element different from the first target element on the whiteboard application interface. The difference is that the third selection operation is performed after the first sub-window is generated. The above-mentioned second windowing operation is of the same type as the first windowing operation. The difference is that the second windowing operation is performed after the first sub-window is generated.

The above-mentioned second sub-window has the same properties as the first sub-window, and both are floated on the whiteboard application interface, are smaller than the whiteboard application interface, and can be stretched or moved. The second sub-window and the first sub-window may not overlap, so that the two sub-windows can be visually displayed jointly on the whiteboard application interface, thereby eliminating the need for the user to perform position movement operations on the two sub-windows.

In the above solution, the display interface of the whiteboard application can not only select a target element and generate a sub-window for display, but also select multiple preset elements and generate multiple sub-windows for separate display, so as to achieve a fixed display of different elements. For example, when the application is used in a conference scenario, after a certain table is fixedly exhibited, the important content written by the user during the analysis of the table during the conference can also be fixedly exhibited, so that the fixed exhibition of the two parts can be maintained throughout the conference. Moreover, the contents of the two parts are displayed in different sub-windows, and it is convenient to perform move, zoom, and other operations on one part of them.

It should be noted that when multiple sub-windows are generated in the whiteboard, a level of the sub-windows generated later is higher than that of the sub-windows generated earlier, that is, the sub-window generated later will be in front of all windows. When a sub-window is clicked arbitrarily, the level of the sub-window becomes the front level by default.

Figure 4B:
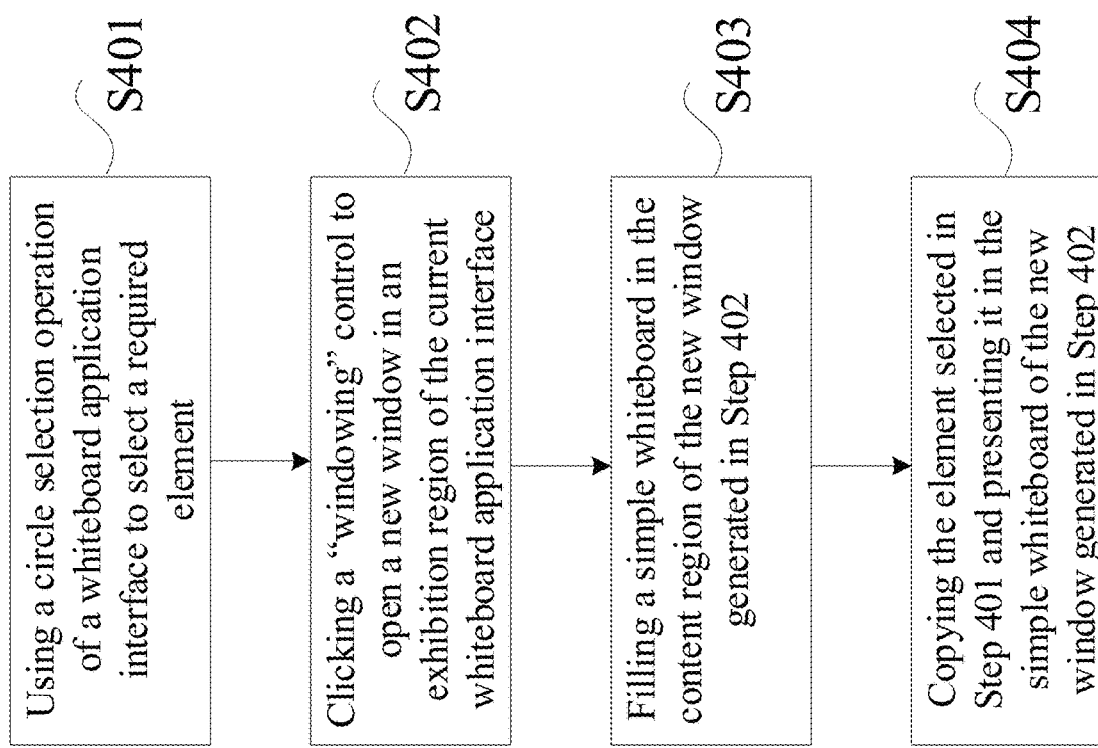
FIG. 4b is a schematic diagram of generating a sub-window and displaying a selected content in the sub-window according to some embodiments of the present disclosure.

FIG. 4b is a schematic diagram of generating a sub-window and displaying a selected content in the sub-window in an embodiment of the present disclosure. As shown in combination with FIG. 4b, the solution includes the following steps:

Step 401: using a circle selection operation of a whiteboard application interface to select a required element.

Step 402: clicking a "windowing" control to open a new window in an exhibition region of the current whiteboard application interface.

Step 403: filling a simple whiteboard in the content region of the new window generated in Step 402. The simple whiteboard is a whiteboard page that only supports three functions of writing, erasing and roaming, and is used to present the element selected in Step 401.

Step 404: copying the element selected in Step 401 and presenting it in the simple whiteboard of the new window generated in Step 402.

The complete copy and paste process may include: acquiring storage information of the element itself (such as position, size, type, dot trajectory data, etc.), and redrawing in the window according to the obtained storage information.

Embodiment 3

Figure 5:
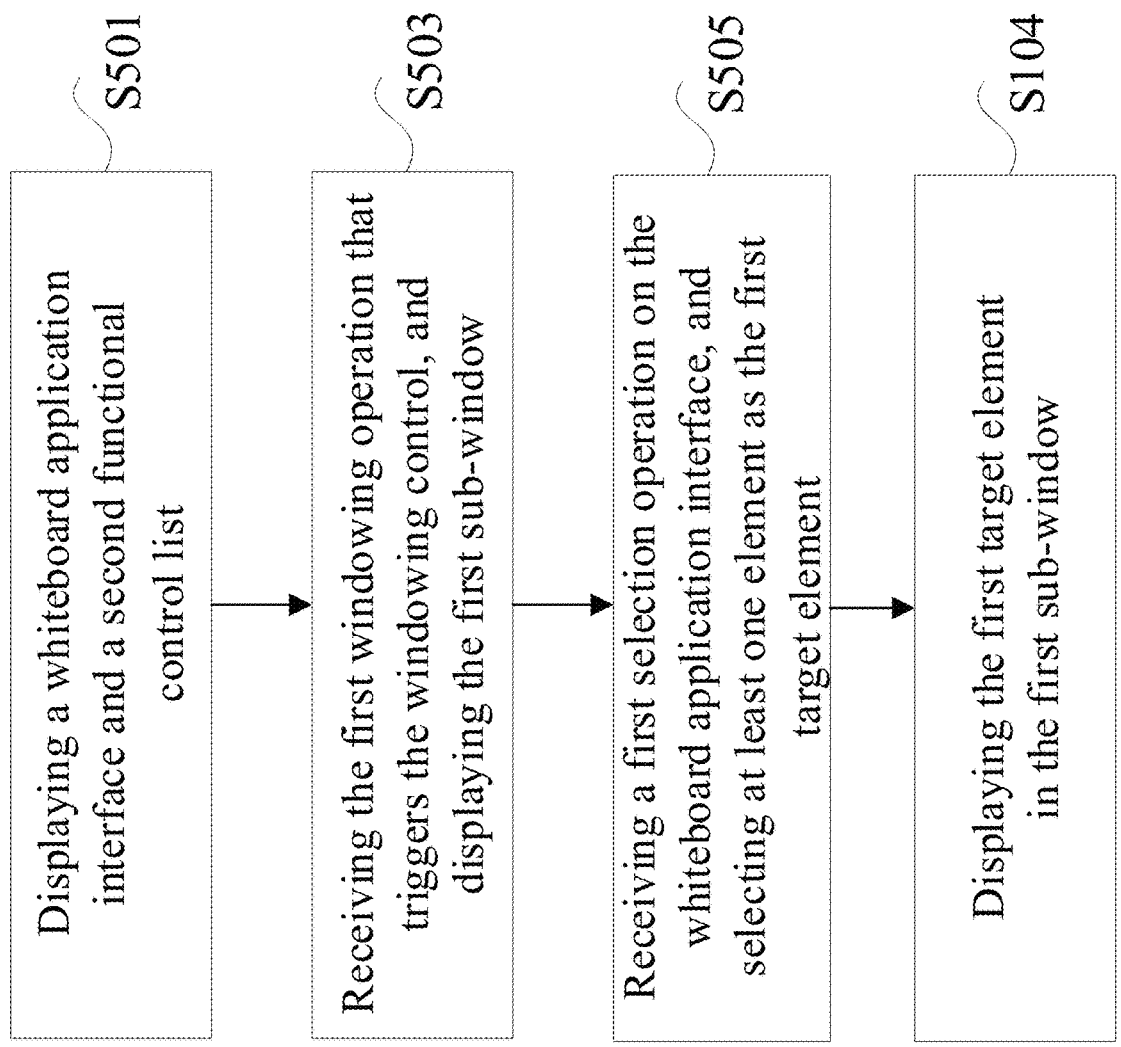
FIG. 5 is a flowchart of another method for controlling an interactive white board according to some embodiments of the present disclosure.

According to embodiments of the present disclosure, an embodiment of a method for controlling an interactive whiteboard is provided. FIG. 5 is a flowchart of another method for controlling an interactive white board according to an embodiment of the present disclosure. This embodiment is obtained by making changes based on the above-mentioned Embodiment 1. As shown in FIG. 5, the method includes the following steps:

Step S501, displaying a whiteboard application interface and a second functional control list, wherein the second functional control list is displayed in a preset region of the whiteboard application interface, the second functional control list at least includes a windowing control, and the windowing control is used for a windowing processing.

The above-mentioned second functional control list may be displayed immediately on the whiteboard application interface when the whiteboard application interface is opened. The second function list may include common function controls of the whiteboard, such as writing, erasing, inserting, etc. The second functional control list at least includes windowing controls, and in addition to windowing controls, the second functional control list can include other controls.

Step S503, receiving the first windowing operation that triggers the windowing control, and displaying the first sub-window.

After the windowing control is triggered, the first sub-window is displayed. The first sub-window herein is similar to the first sub-window in Embodiment 1. The difference lies in timings of generation, which will not be repeated herein.

Figure 6:
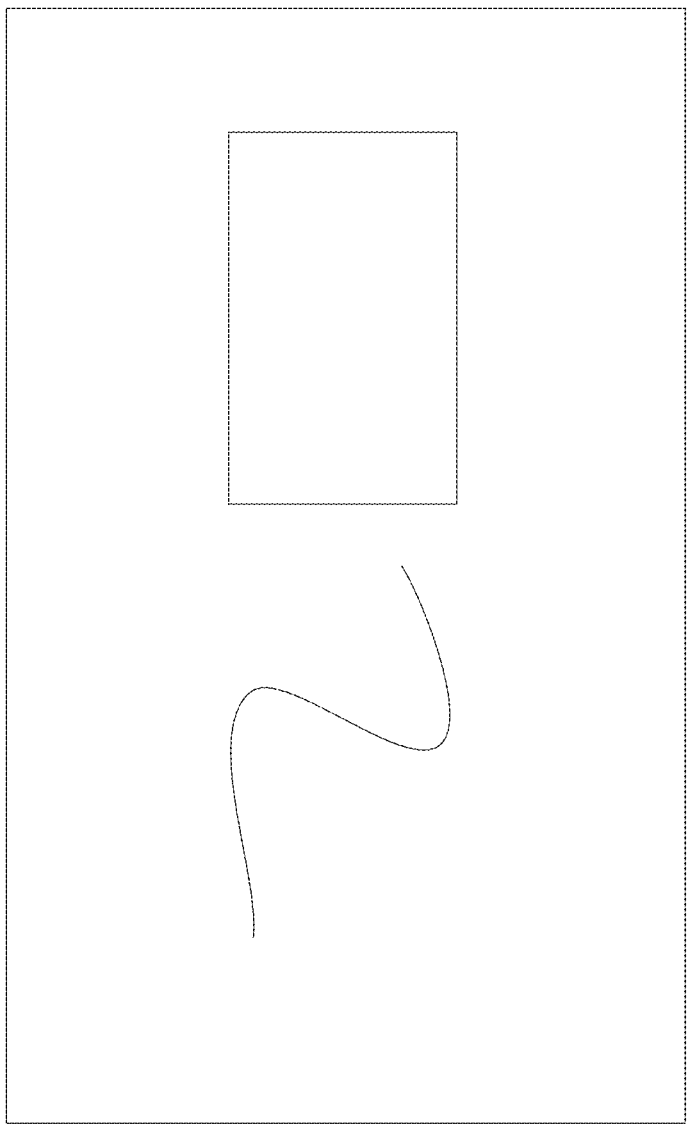
FIG. 6 is a schematic diagram of displaying the first sub-window without selecting the target element according to some embodiments of the present disclosure.

FIG. 6 is a schematic diagram of displaying the first sub-window without selecting target element in the embodiment of the present disclosure. As shown in combination with FIG. 6, in this solution, the first sub-window is first displayed according to the first windowing operation, without selecting the target element, so the first sub-window is empty at this time.

Step S505, receiving a first selection operation on the whiteboard application interface, and selecting at least one element as the first target element.

The first selection operation can be an operation generated by clicking, sliding and other actions on the whiteboard application interface after the user triggers a "selection" control on the whiteboard, or can be a circle selection operation directly on the whiteboard. A target element selected by the selection operation can include a handwriting, and can also include other elements inserted in the whiteboard, and it can also be a circle selection operation and/or a long-press selection operation.

In the example shown in FIG. 6, after the first sub-window is displayed on the whiteboard application interface, the user selects the first target element through the first selection operation, thus the effect shown in FIG. 2 can be obtained.

Step S104: displaying the first target element in the first sub-window, wherein the first sub-window is displayed in a front of the whiteboard application interface, and the first sub-window is smaller than the whiteboard application interface.

Step S106, receiving a writing operation on the whiteboard application interface, and generating a handwriting.

The above writing operation is generated on the whiteboard application interface, and is used to generate a handwriting on the whiteboard application interface. The above steps S104 and S106 are the same as the steps S104 and S106 in Embodiment 1, and will not be repeated herein. It can be seen that the above solution provided by this embodiment can also achieve the effect of displaying the target element in the sub-window. The difference from Embodiment 2 is that the solution of Embodiment 2 first selects the target element and then generates the sub-window, while this embodiment first generates a blank sub-window, and then select the target element when needed. The solution provided by this embodiment generates a sub-window first, so that when the user needs to use the sub-window needs to display the target element, only select the target element, and the operation is very convenient.

As an alternative embodiment, the step of displaying the first target element in the first sub-window includes: receiving a first drag operation that acts on the first target element, and copying and displaying the first target element in the first sub-window after the first drag operation drags the first target element to the first sub-window; or receiving a copy operation that acts on the first target element, and displaying the first target element in the first sub-window after receiving a paste operation that acts on the first sub-window.

The above solution provides two schemes for displaying the first target element in the first sub-window, which are described separately as follows:

In a first solution, after the first target element is selected, the first target element can be copied and displayed in the first sub-window by dragging the first target element. The copy and display herein is used to indicate that the first target element originally selected on the whiteboard application interface does not disappear with the first drag operation, and the first target element displayed in the first sub-window is obtained by copying.

In a second solution, the selected first target element is directly copied, and is pasted in the first sub-window, so as to display the first target element in the first sub-window.

Therefore, this embodiment only copies the first target element and fixedly exhibit it on the whiteboard application interface, which will not affect the modification of the overall display content of the whiteboard application interface, so that after the exhibition is completed, when the user needs to save a exhibition content generated by a operation on the whiteboard application interface, the complete exhibition content can be saved directly, and there will be no problems such as content loss.

Embodiment 4

Figure 7:
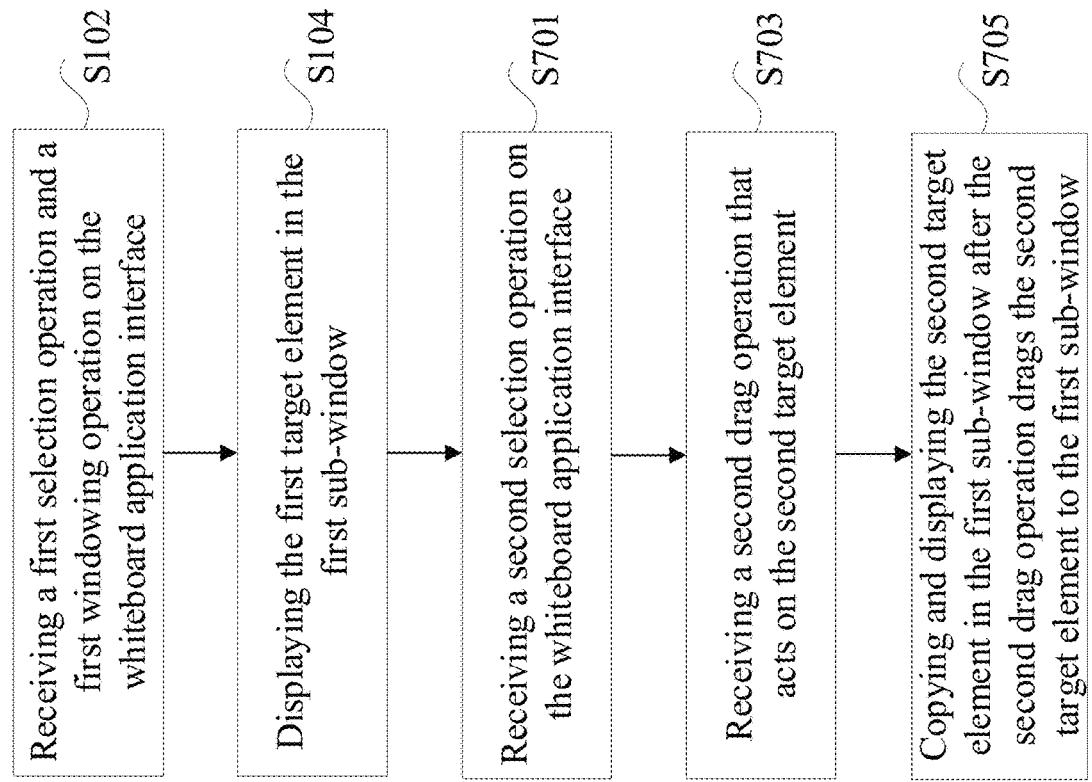
FIG. 7 is a flowchart of another method for controlling an interactive white board according to some embodiments of the present disclosure.

According to embodiments of the present disclosure, an embodiment of a method for controlling an interactive white board is provided. FIG. 7 is a flowchart of another method for controlling an interactive white board in an embodiment of the present disclosure. This embodiment is obtained by making changes based on the above-mentioned Embodiment 1. As shown in FIG. 7, the method includes the following steps:

Step S102, receiving a first selection operation and a first windowing operation on the whiteboard application interface, wherein the whiteboard application interface displays a plurality of elements, the first selection operation is used to select at least one element on the whiteboard application interface as a first target element, and the first windowing operation is used to start at least one first sub-window on the whiteboard application interface.

Step 104, displaying the first target element in the first sub-window, wherein the first sub-window is displayed in a front of the whiteboard application interface, and the first sub-window is smaller than the whiteboard application interface.

Step S106, receiving a writing operation on the whiteboard application interface, and generating a handwriting.

The above three steps are the same as the steps S102, S104 and S106 in Embodiment 1, and will not be repeated herein.

Step S701, receiving a second selection operation on the whiteboard application interface, wherein the second selection operation is used to select at least one element on the whiteboard application interface as the second target element.

The above-mentioned second selection operation is used to select a target element again from the whiteboard application interface, and the target element is the second target element. The second selection operation may also be a circle selection operation and/or a long-press selection operation.

Step S703, receiving a second drag operation that acts on the second target element.

The above-mentioned second drag operation is used to drag the second target element to any sub-window.

Step S705, copying and displaying the second target element in the first sub-window after the second drag operation drags the second target element to the first sub-window. The copy and display herein is used to indicate that the second target element originally selected on the whiteboard application interface does not disappear with the second drag operation, and the second target element displayed in the second sub-window is obtained by copying.

It should be noted that after the second target element is displayed in the sub-window, other target elements may be continuously selected and displayed in the first sub-window. When multiple target elements are included in the first sub-window, the target element in the first sub-window may also be deleted.

In the above-mentioned embodiment of the present disclosure, the second drag operation drags the second target element to the first sub-window, and the second target element is displayed in the first sub-window, so as to achieve a purpose of displaying multiple target elements in one sub-window. After one sub-window is generated, when other elements need to be displayed in the sub-window, there is no need to generate a new sub-window, and the selected target element can be displayed in the already generated sub-window, which is very convenient to use.

As an alternative embodiment, the above method further includes receiving a preset operation on the first target element in the first sub-window, and restoring a display of a writing region that contains the first target element on the whiteboard application interface. It can be understood that the preset operation may be one of gesture operations such as clicking, long pressing, and double clicking, or a gesture operation of dragging the first target element to the whiteboard application interface. It can also be understood that there can be many implementation approaches for restoring the display of the writing region that contains the first target element on the whiteboard application interface. For example, recognizing the content on the whiteboard application interface or in the writing page, determining that the position of the content matching the selected target element on the whiteboard application interface or in the writing page, and moving the whiteboard application interface or the writing page as a whole to make the content visible; or, when adding a first target element to the first sub-window, recording the display position of the first target element on the whiteboard application interface or in the writing page, acquiring the whiteboard application interface or the writing page that contains the first target element according to the display position, and entirely moving the display of the whiteboard application interface or the writing page so as to make the content of the whiteboard that contains the first target element visible; or, recording an identifier of the handwritten page where the first target element is located, a page position A in the handwritten page and a screen display position B, acquiring the handwritten page where the first target element is located according to the handwritten page identifier when a preset operation on the first target element in a sub-window is received, aligning the page position A in the handwritten page with the screen display position B, and displaying the handwritten page where the first target element is located, wherein the record is stored in a file in the first sub-window.

In an alternative embodiment, after the first target element is selected, the whiteboard application interface may also record the location of the first target element. After the first target element is displayed in the first sub-window, if a user's operation of dragging the first target element from the first sub-window to another position on the whiteboard application interface is received, the first target element can be restored and displayed in the recorded position.

Through the above solution, operations on the first target element are made more diversified, not only can it be displayed in the first sub-window, but also its original display state can be restored, thereby providing users with multiple display modes.

As an alternative embodiment, after the step of displaying the first target element in the first sub-window, the method further includes any one or more of the following steps: receiving an erasing operation that acts on the first sub-window, and erasing an element in the first sub-window according to the erasing operation; receiving a writing operation that acts on the first sub-window, and generating a handwriting in the first sub-window according to the writing operation; and receiving a movement operation on an element in the first sub-window, moving a display position of the element in the first sub-window according to the movement operation, and expanding an area of the writing region in the first sub-window after the element is moved beyond a display rang of the first sub-window.

In the above solution, the first sub-window is filled by a simple whiteboard with partial functions. In an alternative embodiment, the simple whiteboard that fills the first sub-window includes writing, erasing, and roaming functions. Herein, the definition of the writing region of the first sub-window is the same as the writing region of the whiteboard application, and refers to a region used for operations such as writing, inserting elements, and moving elements. The initial area of the writing region of the first sub-window is set by default to be as large as that of the display range of the first sub-window. After the element is moved beyond the display range of the first sub-window, the area of the writing region of the first sub-window is expanded, which can expand the accommodating space of the first sub-window, so that more elements can be accommodated. For example, in the exhibition process, the show focus element A is displayed in the first sub-window. At the same time of exhibition, in addition to exhibiting the record on the whiteboard application interface, it is also possible to write notes and explain in the first sub-window, and when there is more writing content, to expand the area of the writing region in the first sub-window. It goes without saying that after the writing in the first sub-window is finished, it is possible to move the elements in the first sub-window, and keep the show focus element A displaying in the first sub-window.

It should be noted that when the user performs writing or erasing operations in the sub-window, it does not affect the display of elements in the original whiteboard application interface.

Through the above solution, not only can the target element be displayed in the sub-window, but also simple operations can be performed on the target element displayed in the sub-window, such as writing, erasing, and moving elements.

As an alternative embodiment, after the step of displaying the first target element in the first sub-window, the method further includes: receiving a switching operation of writing page, wherein the whiteboard application interface opens a plurality of writing pages, and the switching operation is used to switch the writing pages of the whiteboard application interface; and switching a writing page of the whiteboard application interface, and keeping displaying the first sub-window in front of the switched writing page.

The whiteboard application interface can include multiple writing pages and can switch between different writing pages. The instruction of switching the writing page can be initiated by the user through a multi-finger sliding operation, or by triggering a designated control. The switching operation of the writing page is used to switch the current writing page to another writing page. In the above solution, after the writing page of the whiteboard application interface is switched, the display of the sub-window is not affected, and the sub-window is still floating above the whiteboard application interface, thus achieving the purpose of maintaining the display of the sub-window when the writing page is operated.

Figure 8:
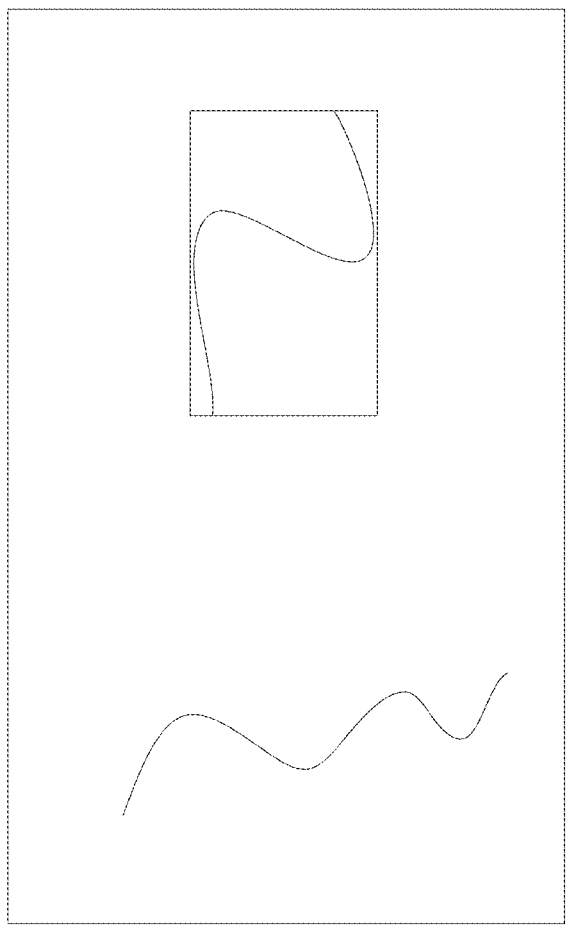
FIG. 8 is a schematic diagram of switching writing pages in the case of displaying a sub-window according to some embodiments of the present disclosure.

FIG. 8 is a schematic diagram of switching writing pages in the case of displaying a sub-window in an embodiment of the present disclosure. As shown in combination with FIG. 8, the current writing page of the whiteboard application interface has been switched according to a user's switching instruction, but the sub-window does not disappear with the switching of the writing page, but is displayed on the switched written page.

As an alternative embodiment, after the step of displaying the first target element in the first sub-window, the method further includes: receiving an operation of adding new writing pages, wherein the operation of adding new writing pages is used to add a writing page on the whiteboard application interface; and adding a new writing page to the whiteboard application interface, and keeping displaying the first sub-window in front of the newly added writing page.

The whiteboard application interface can accommodate multiple writing pages, and the above-mentioned operation of adding new writing pages may be adding at least one blank writing page on the whiteboard application interface. After the new writing page is added, the first sub-window is still floating above the whiteboard application interface, that is, displayed on the new writing page.

As an alternative embodiment, after the step of displaying the first target element in the first sub-window, the method further includes: receiving a movement operation on an element on the whiteboard application interface, moving a display position of the element on the whiteboard application interface, and expanding an area of the writing region of the whiteboard application interface after the element is moved beyond a display rang of the interactive white board, and keeping displaying the first sub-window in a front of the whiteboard application interface.

The above-mentioned movement operation is used to move elements on the whiteboard application interface. The operation can be multi-finger touching the elements on the whiteboard application interface and moving them together, so that the whiteboard application interface receives the movement operation on the elements on the whiteboard application interface. Since the first sub-window is floating above the whiteboard application interface, when the writing region of the whiteboard application interface moves, the first sub-window does not move with it, but maintains its original position and is displayed in a front of the writing region.

It can be seen from this that, the above-mentioned embodiment of the present disclosure includes: receiving a first selection operation and a first windowing operation on a whiteboard application interface, wherein the whiteboard application interface displays a plurality of elements, and the first selection operation is used to select at least one element on the whiteboard application interface as a first target element, and the first windowing operation is used to start at least one first sub-window on the whiteboard application interface; displaying the first target element in the first sub-window; and receiving a writing operation on the whiteboard application interface, and generating a handwriting, wherein the first sub-window is displayed in a front of the whiteboard application interface, and the first sub-window is smaller than the whiteboard application interface. According to the above solution, a window smaller than the whiteboard application interface is generated according to the windowing operation, so as to display the target element selected by the user, so that the target element in the newly generated window does not move with the user's movement operation of the element on the whiteboard application interface, nor does it switch with the user's switching of the writing page on the whiteboard application interface, Therefore, when the user operates the element or the writing page, the target element in the newly generated window can be always shown on the whiteboard application interface, so that the user can continuous exhibit the target element in combination with the functions of the whiteboard application such as writing and inserting elements, without requiring the user to retrieve it repeatedly, which solves the technical problem in related art that when an operation is performed in the current writing region, elements will moves or disappears with the operation, which causes inconvenience to the user. And users can use the functions of the whiteboard application such as writing and inserting elements to perform continuous exhibition of the elements displayed in the window, so as to achieve the focus effect and continuity of the content exhibition.

Embodiment 5

Figure 9:
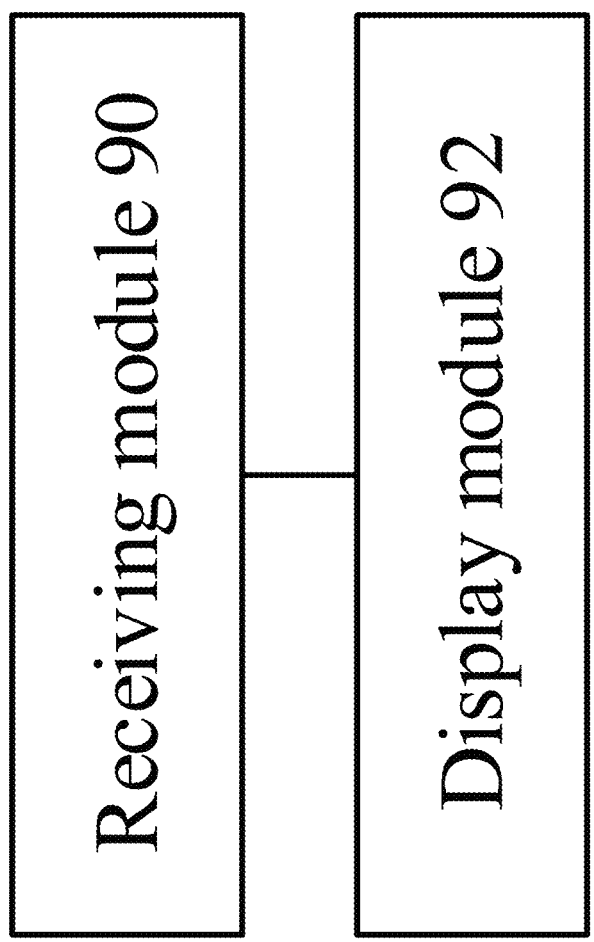
FIG. 9 is a schematic diagram of a control device of an interactive white board according to some embodiments of the present disclosure.

According to embodiments of the present disclosure, an embodiment of a control device of an interactive white board is provided. FIG. 9 is a schematic diagram of a control device of an interactive white board in an embodiment of the present disclosure. As shown in FIG. 9, the device includes the following modules.

A first receiving module 90, configured to receive a first selection operation and a first windowing operation on a whiteboard application interface, wherein the whiteboard application interface displays a plurality of elements, the first selection operation is used to select at least one element on the whiteboard application interface as a first target element, and the first windowing operation is used to start at least one first sub-window on the whiteboard application interface.

A display module 92, configured to display the first target element in the first sub-window, wherein the first sub-window is displayed in a front of the whiteboard application interface, and the first sub-window is smaller than the whiteboard application interface.

A second receiving module 94, configured to receive a writing operation on the whiteboard application interface, and generate a handwriting.

As an alternative embodiment, the first receiving module includes: a first receiving sub-module, configured to receive the first selection operation on the whiteboard application interface, and select at least one element as the first target element; a display sub-module, configured to display a first functional control list after the first target element is selected, wherein the first functional control list is displayed in a preset region of the whiteboard application interface, the first functional control list at least includes a windowing control, and the windowing control is used for a windowing processing; and a second receiving sub-module, configured to receive a first windowing operation that triggers the windowing control, and display the first sub-window.

As an alternative embodiment, the first receiving module includes: a second display sub-module, configured to display a whiteboard application interface and a second functional control list, wherein the second functional control list is displayed in a preset region of the whiteboard application interface, the second functional control list at least includes a windowing control, and the windowing control is used for a windowing processing; a third receiving sub-module, configured to receive the first windowing operation that triggers the windowing control, and display the first sub-window; and a fourth receiving sub-module, configured to receive a first selection operation on the whiteboard application interface, and select at least one element as the first target element.

As an alternative embodiment, the first selection operation is a circle selection operation and/or a long-press selection operation.

As an alternative embodiment, the display module includes: a fifth receiving sub-module, configured to receive a first drag operation that acts on the first target element, and copy and display the first target element in the first sub-window after the first drag operation drags the first target element to the first sub-window, or configured to receive a copy operation that acts on the first target element, and display the first target element in the first sub-window after receiving a paste operation that acts on the first sub-window.

As an alternative embodiment, the device further includes: after the step of displaying the first target element in the first sub-window, a third receiving module, configured to receive a second selection operation on the whiteboard application interface, wherein the second selection operation is used to select at least one element on the whiteboard application interface as a second target element; a fourth receiving module, configured to receive a second drag operation that acts on the second target element; and a copying and display module, configured to copy and display the second target element in the first sub-window after the second drag operation drags the second target element to the first sub-window.

As an alternative embodiment, the device further includes: a fifth receiving module, configured to after the step of displaying the first target element in the sub-window, receive a third selection operation on the whiteboard application interface, wherein the third selection operation is used to select at least one element on the whiteboard application interface as a third target element; a sixth receiving module, configured to receive a second windowing operation that triggers a windowing control, and display a second sub-window, wherein the second sub-window is displayed in a front of the whiteboard application interface, and the second sub-window is smaller than the whiteboard application interface; and a second copying and display module, configured to copy and display the third target element in the second sub-window.

As an alternative embodiment, the second receiving sub-module or the third receiving sub-module includes: a first acquiring unit, configured to acquire a minimum enclosing rectangle of the first target element; a second acquiring unit, configured to acquire size information of the minimum enclosing rectangle; and a generating unit, configured to generate a first sub-window having the same size information as the minimum enclosing rectangle.

As an alternative embodiment, if the minimum enclosing rectangle of the first target element is larger than a preset maximum size of the first sub-window, the target element is shrunk and then displayed in the first sub-window.

As an alternative embodiment, the device further includes: a display restoring module, configured to receive a preset operation on the first target element in the first sub-window, and restore a display of a writing region that contains the first target element on the whiteboard application interface.

As an alternative embodiment, the device further includes the following one or more: a seventh receiving module, configured to after the step of displaying the first target element in the first sub-window, receive an erasing operation that acts on the first sub-window, and erase an element in the first sub-window according to an erasing operation; an eighth receiving module, configured to receive a writing operation that acts on the first sub-window, and generate a handwriting in the first sub-window according to the writing operation; and a ninth receiving module, configured to receive a movement operation on an element in the first sub-window, move a display position of the element in the first sub-window according to the movement operation, and expand an area of the writing region in the first sub-window after the element is moved beyond a display rang of the first sub-window.

As an alternative embodiment, the device further includes: a tenth receiving module, configured to after the step of displaying the first target element in the first sub-window, receive a switching operation of a writing page, wherein the whiteboard application interface opens a plurality of writing pages, and the switching operation is used to switch writing pages of the whiteboard application interface; and a first keeping module, configured to switch a writing page of the whiteboard application interface, and keep displaying the first sub-window in front of the switched writing page.

As an alternative embodiment, the device further includes: an eleventh receiving module, configured to after the step of displaying the first target element in the first sub-window, receive an operation of adding new writing pages, wherein the operation of adding new writing pages is used to add a writing page on the whiteboard application interface; and a second keeping module, configured to add a new writing page to the whiteboard application interface, and keep displaying the first sub-window in front of the newly added writing page.

As an alternative embodiment, the device further includes: a twelfth receiving module, configured to after the step of displaying the first target element in the first sub-window, receive a movement operation on an element on the whiteboard application interface, and a third keeping module, configured to move a display position of the element on the whiteboard application interface, expand an area of a writing region of the whiteboard application interface after the element is moved beyond a display rang of the interactive white board, and keep displaying the first sub-window in front of the whiteboard application interface.

As an alternative embodiment, the first target element is a handwriting, and the device further includes: a copying module, configured to after receiving the first selection operation on the whiteboard application interface, store a data sequence of the first target element. The display module includes: an extracting sub-module, configured to extract the data sequence of the first target element, and generate the first target element in the first sub-window according to the data sequence.

It can be seen from this that, in the above-mentioned embodiment of the present disclosure, a first receiving module receives a first selection operation and a first windowing operation on a whiteboard application interface, wherein the whiteboard application interface displays a plurality of elements, and the first selection operation is used to select at least one element on the whiteboard application interface as a first target element, and the first windowing operation is used to start at least one first sub-window on the whiteboard application interface; a display module displays the first target element in the first sub-window; and a second receiving module receives a writing operation on the whiteboard application interface and generates a handwriting, wherein the first sub-window is displayed in front of the whiteboard application interface, and the first sub-window is smaller than the whiteboard application interface. According to the above solution, a window smaller than the whiteboard application interface is generated according to the windowing operation, so as to display the target element selected by the user, so that the target element in the newly generated window does not move with the user's movement operation of the element on the whiteboard application interface, nor does it switch with the user's switching of the writing page on the whiteboard application interface. Therefore, when the user operates elements or the writing pages, the target element in the newly generated window can be always shown on the whiteboard application interface, so that the user can continuous exhibit the target element in combination with the functions of the whiteboard application such as writing and inserting elements, without requiring the user to retrieve it repeatedly, which solves the technical problem in related art that: when an operation is performed in the current writing region, elements will move or disappear with the operation, which causes inconvenience to the user. And users can use the functions of the whiteboard application such as writing and inserting elements to perform continuous exhibition of the elements displayed in the window, so as to achieve the focus effect and continuity of the content exhibition.

Embodiment 6

According to an embodiment of the present disclosure, a computer storage medium is provided, the computer storage medium stores a plurality of instructions, and the instructions are adapted to be loaded by a processor to execute steps of a method according to any one of Embodiments 1 to 4.

In the embodiment of the present disclosure, the storage medium stores a plurality of instructions so that the processor can load to execute the method described in any one of Embodiments 1 to 4. Therefore, the device controlled by the processor can generate a window smaller than the whiteboard application interface according to the windowing operation, so as to display the target element selected by the user, so that the target element in the newly generated window does not move with the user's movement operation of the element on the whiteboard application interface, nor does it switch with the user's switching of the writing page on the whiteboard application interface. Therefore, when the user operates elements or the writing pages, the target element in the newly generated window can be always shown on the whiteboard application interface for continuous exhibition without requiring the user to retrieve it repeatedly, which solves the technical problem in related art that when an operation is performed in the current writing region, elements will move or disappear with the operation, which causes inconvenience to the user. And users can use the functions of the whiteboard application such as writing and inserting elements to perform continuous exhibition of the elements displayed in the window, so as to achieve the focus effect and continuity of the content exhibition.

Embodiment 7

According to an embodiment of the present disclosure, an interactive white board is provided, including: a processor and a memory, wherein the memory stores a computer program, and the computer program is adapted to be loaded by the processor to execute steps of a method according to any one of Embodiments 1 to 4.

Figure 10:
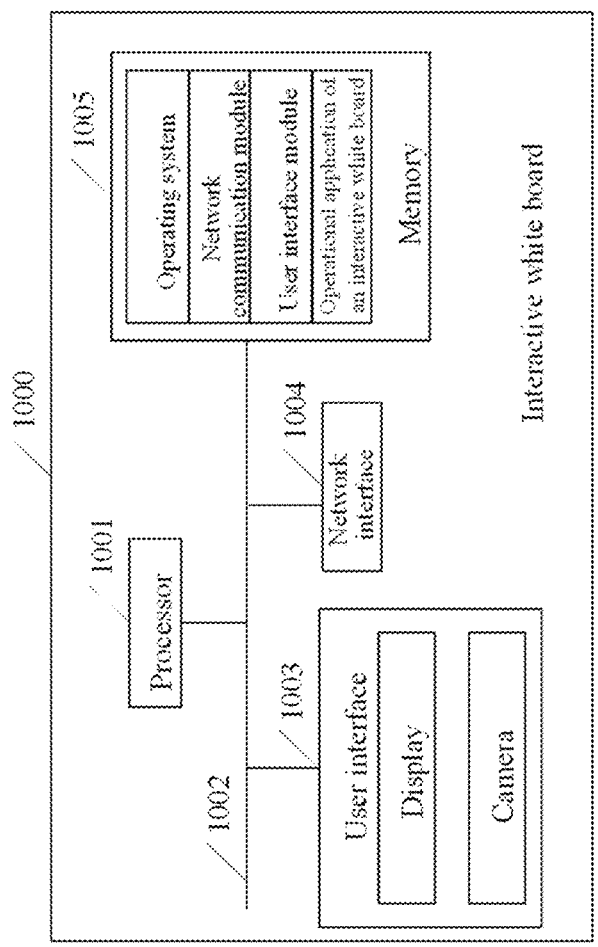
FIG. 10 is a schematic structure diagram of an interactive white board according to some embodiments of the present disclosure.

FIG. 10 is a schematic structure diagram of an interactive white board provided by an embodiment of the present disclosure. As shown in combination with FIG. 10, the interactive white board 1000 may include: at least one processor 1001, at least one network interface 1004, a user interface 1003, a memory 1005, and at least one communication bus 1002.

Thereinto, the communication bus 1002 is configured to implement connection and communication between these components.

Thereinto, the user interface 1003 may include a display and a camera, and the user interface 1003 may further optionally include a standard wired interface and a wireless interface.

Thereinto, the network interface 1004 may optionally include a standard wired interface and a wireless interface (such as a WI-FI interface).

Thereinto, the processor 1001 may include one or more processing cores. The processor 1001 uses various interfaces and lines to connect various parts of the entire interactive white board 1000, and performs various functions of the interactive white board 1000 and processes data by running or executing instructions, programs, code sets or instruction sets stored in the memory 1005, and calling data stored in the memory 1005. Optionally, the processor 1001 may be realized by adopting at least one kind of hardware forms such as Digital Signal Processing (DSP), Field-Programmable Gate Array (FPGA), and Programmable Logic Array (PLA). The processor 1001 may integrate one or a combination of Central Processing Unit (CPU), Graphics Processing Unit (GPU), and a modem. Thereinto, CPU mainly processes the operating system, user interface, application programs, and the like. GPU is used to render and draw the content that needs to be displayed on the display screen. The modem is used to process wireless communication. It is understood that the above-mentioned modem may not be integrated into the processor 1001, but be implemented by a chip alone.

The memory 1005 may include Random Access Memory (RAM) or Read-Only Memory (Read-Only Memory). Optionally, the memory 1005 includes a non-transitory computer-readable storage medium. The memory 1005 may be used to store instructions, programs, codes, code sets or instruction sets. The memory 1005 may include a program storage region and a data storage region, wherein the program storage region may store instructions for implementing the operating system and instructions for at least one function (such as touch function, sound playback function, image playback function, etc.), instructions for implementing the above method embodiments, etc. The data storage region can store the data involved in the above method embodiments, etc. Optionally, the memory 1005 may also be at least one storage device located far away from the above-mentioned processor 1001. As shown in FIG. 10, the memory 1005, which is a computer storage medium, may include an operating system, a network communication module, a user interface module, and an operating application program of an interactive white board.

In the interactive white board 1000 shown in FIG. 10, the user interface 1003 is mainly used to provide an input interface for the user, and acquire data input by the user, and the processor 1001 can be used to call the operating application program of the interactive white board stored in the memory 1005, and can perform any of the operations in Example 1.

The serial numbers of the above-mentioned embodiments of the present disclosure are only for description, and do not represent the superiority or inferiority of the embodiments.

In the above-mentioned embodiments of the present disclosure, the description of each embodiment has its own focus. For a part that is not described in detail in one embodiment, reference may be made to related descriptions of other embodiments.

Those skilled in the art should understand that the embodiments of the present disclosure can be provided as a method, a system, or a computer program product. Therefore, the present disclosure may adopt the form of a complete hardware embodiment, a complete software embodiment, or an embodiment combining software and hardware. Moreover, the present disclosure may adopt the form of a computer program product implemented on one or more computer-usable storage media (which may include disk storage, CD-ROM, optical storage, etc.) containing computer-usable program codes.

The present disclosure is described with reference to flowcharts and/or block diagrams of methods, devices (systems), and computer program products in embodiments of the present disclosure. It should be understood that each process and/or block in the flowchart and/or block diagram, and the combination of processes and/or blocks in the flowchart and/or block diagram can be implemented by computer program instructions. These computer program instructions can be provided to the processor of a general-purpose computer, a special-purpose computer, an embedded processor, or other programmable data processing equipment to generate a machine, so that with the instructions executed by the processor of the computer or other programmable data processing equipment, a device that is used to implement the functions specified in one process or multiple processes in the flowchart and/or one block or multiple blocks in the block diagram is generated.

These computer program instructions can also be stored in a computer-readable memory that can direct a computer or other programmable data processing equipment to work in a specific manner, so that the instructions stored in the computer-readable memory produce an article of manufacture including the instruction device. The instruction device implements the functions specified in one process or multiple processes in the flowchart and/or one block or multiple blocks in the block diagram.

These computer program instructions can also be loaded on a computer or other programmable data processing equipment, so that a series of operation steps are executed on the computer or other programmable equipment to produce computer-implemented processing, thus the instructions executed on the computer or other programmable equipment provide steps for implementing functions specified in a flow or multiple flows in the flowchart and/or a block or multiple blocks in the block diagram.

In a typical configuration, the computing device includes one or more processors (CPUs), input/output interfaces, network interfaces, and memory.

The memory may include non-permanent memory, random access memory (RAM) and/or non-volatile memory, etc. in a computer-readable medium, such as read-only memory (ROM) or flash memory (flash RAM). The memory is an example of a computer-readable medium.

Computer-readable storage media include permanent and non-permanent, removable and non-removable media, and information storage can be achieved by any method or technology. The information can be computer-readable instructions, data structures, program modules, or other data. Examples of computer-readable storage media include, but are not limited to: phase change memory (PRAM), static random access memory (SRAM), dynamic random access memory (DRAM), other types of random access memory (RAM), read-only memory (ROM), electrically erasable programmable read-only memory (EEPROM), flash memory or other memories, compact disc read-only memory (CD-ROM), digital versatile disc (DVD) or other optical storage, magnetic cassette tape, magnetic disk storage or other magnetic storage devices or any other non-transmission media which can be used to store information capable of being accessed by computing devices. According to the definition in the present disclosure, computer-readable media does not include transitory media, such as modulated data signals and carrier waves.

It should also be noted that the terms "include", "comprise" or any other variants thereof are intended to cover non-exclusive inclusion, so that a process, method, commodity or equipment including a series of elements not only includes those elements, but also includes other elements that are not explicitly listed, or also include elements inherent to such processes, methods, commodities, or equipment. If there are no more restrictions, the element defined by the sentence "including a . . . " does not exclude the existence of other identical elements in the process, method, commodity, or equipment that includes the element.

What is claimed is:

1. A method for controlling an interactive white board, comprising:
   receiving a first selection operation and a first windowing operation on a whiteboard application interface, wherein the whiteboard application interface displays a plurality of elements, the first selection operation is configured to select at least one of the plurality of elements on the whiteboard application interface as a first target element, and the first windowing operation is configured to start at least one first sub-window on the whiteboard application interface;
   in response to the first target element being selected, acquiring an enclosure surrounding the first target element and displaying a first functional control list adjacent to the enclosure, wherein the first functional control list comprises a first windowing control;
   displaying the first target element in the first sub-window in response to the first windowing control being triggered; and
   receiving a writing operation on the whiteboard application interface, and generating a handwriting, wherein in response to the handwriting overlapping the first sub-window, generating an overlapping part of the handwriting behind the first sub-window, and the first sub-window is displayed in a front of the whiteboard application interface, wherein the first sub-window is smaller than the whiteboard application interface, and wherein the overlapping part of the handwriting is displayed only after the first sub-window is removed or the handwriting is moved.

2. The method according to claim 1, wherein the first selection operation comprises at least one of a circle selection operation and a long-press selection operation.

3. The method according to claim 2, wherein after receiving the circle selection operation, the method further comprises:
   determining the selected first target element according to the circle selection operation, wherein the circle selection operation indicates that a single finger of a user slides on the whiteboard application interface to form a closed or unclosed curved trajectory, and at least one of the plurality of elements included in the trajectory or touched by the closed or unclosed curved trajectory is selected.

4. The method according to claim 2, wherein the first selection operation comprises the circle selection operation and the long-press selection operation, wherein after at least one of the plurality of elements is circled, the long-press selection operation is then performed on the circled elements to determine the first target element to be selected.

5. The method according to claim 1, after displaying the first target element in the first sub-window, the method further comprises:
   receiving a second selection operation on the whiteboard application interface, wherein the second selection operation is configured to select at least one of the plurality of elements on the whiteboard application interface as a second target element;
   receiving a second drag operation that acts on the second target element; and
   copying and displaying the second target element in the first sub-window after the second drag operation drags the second target element to the first sub-window.

6. The method according to claim 1, wherein after displaying the first target element in the first sub-window, the method further comprises:
   receiving a third selection operation on the whiteboard application interface, wherein the third selection operation is configured to select at least one of the plurality of elements on the whiteboard application interface as a third target element;
   receiving a second windowing operation that triggers a second windowing control, and displaying a second sub-window, wherein the second sub-window is displayed in the front the whiteboard application interface, and the second sub-window is smaller than the whiteboard application interface; and
   copying and displaying the third target element in the second sub-window.

7. The method according to claim 6, wherein the first sub-window and the second sub-window are displayed jointly on the whiteboard application interface, and the first sub-window and the second sub-window do not overlap with each other.

8. The method according to claim 1, wherein displaying the first sub-window comprises:
   acquiring size information of the enclosure; and
   generating the first sub-window having same size information as the enclosure.

9. The method according to claim 8, wherein in response to the enclosure surrounding the first target element being larger than a preset maximum size of the first sub-window, shrinking the first target element and then displaying the first target element in the first sub-window.

10. The method according to claim 1, wherein the method further comprises:
    receiving a preset operation on the first target element in the first sub-window, and restoring a display of a writing region that contains the first target element on the whiteboard application interface.

11. The method according to claim 1, wherein after displaying the first target element in the first sub-window, the method further comprises at least one of:
    receiving an erasing operation that acts on the first sub-window, and erasing at least one of the plurality of elements in the first sub-window according to the erasing operation;
    receiving a writing operation that acts on the first sub-window, and generating handwriting in the first sub-window according to the writing operation; or receiving a movement operation on a moving element in the first sub-window, moving a display position of the moving element in the first sub-window according to the movement operation, and expanding an area of a writing region in the first sub-window after the moving element is moved beyond a display range of the first sub-window.

12. The method according to claim 1, wherein after displaying the first target element in the first sub-window, the method further comprises:
receiving a switching operation of a plurality of writing pages, wherein the plurality of writing pages are opened in the whiteboard application interface, and the switching operation is configured to switch the plurality of writing pages of the whiteboard application interface; and
switching the plurality of writing page of the whiteboard application interface, and keeping displaying the first sub-window in front of the switched writing page.

13. The method according to claim 1, wherein after displaying the first target element in the first sub-window, the method further comprises:
receiving an adding operation of a new writing page, wherein the adding operation of the new writing page is configured to add the new writing page on the whiteboard application interface; and
adding the new writing page to the whiteboard application interface, and keeping displaying the first sub-window in front of the added new writing page.

14. The method according to claim 1, wherein after displaying the first target element in the first sub-window, the method further comprises:
receiving a movement operation on a moving element on the whiteboard application interface; and
moving a display position of the moving element on the whiteboard application interface, expanding an area of a writing region of the whiteboard application interface after the moving element is moved beyond a display range of the interactive white board, and keeping displaying the first sub-window in front of the whiteboard application interface.

15. The method according to claim 1, wherein the first windowing control is triggered by a user clicking on the first windowing control.

16. The method according to claim 1, wherein the first functional control list comprises at least one operation of copying, cutting, or windowing.

17. The method according to claim 1, wherein the first target element is the handwriting, and after receiving the first selection operation on the whiteboard application interface, the method further comprises:
storing a data sequence of the first target element; and
displaying the first target element in the first sub-window comprises: extracting the data sequence of the first target element, and generating the first target element in the first sub-window according to the data sequence.

18. The method according to claim 17, wherein data sequence comprises at least one of the following: position, size, type, attribute, or dot trajectory data.

19. A non-transitory computer-readable medium, wherein the computer-readable medium is configured to store a plurality of instructions, and the instructions are adapted to be loaded by a processor to execute a method for controlling an interactive white board, wherein the method comprises:

receiving a first selection operation and a first windowing operation on a whiteboard application interface, wherein the whiteboard application interface displays a plurality of elements, the first selection operation is configured to select at least one of the plurality of elements on the whiteboard application interface as a first target element, and the first windowing operation is configured to start at least one first sub-window on the whiteboard application interface;
in response to the first target element being selected, acquiring an enclosure surrounding the first target element and displaying a first functional control list adjacent to the enclosure, wherein the first functional control list comprises a first windowing control;
displaying the first target element in the first sub-window in response to the first windowing control being triggered; and
receiving a writing operation on the whiteboard application interface, and generating a handwriting, wherein in response to the handwriting overlapping the first sub-window, generating an overlapping part of the handwriting behind the first sub-window, the first sub-window is displayed in a front of the whiteboard application interface, the first sub-window is smaller than the whiteboard application interface, and the overlapping part of the handwriting is displayed only after the first sub-window is removed or the handwriting is moved.

20. An interactive white board, comprising:
a processor; and
a memory, wherein the memory is coupled to the processor and configured to store a computer program, and the computer program is adapted to be loaded by the processor to execute a method for controlling an interactive white board, wherein the method comprises:
receiving a first selection operation and a first windowing operation on a whiteboard application interface, wherein the whiteboard application interface displays a plurality of elements, the first selection operation is configured to select at least one of the plurality of elements on the whiteboard application interface as a first target element, and the first windowing operation is configured to start at least one first sub-window on the whiteboard application interface;
in response to the first target element being selected, acquiring an enclosure surrounding the first target element and displaying a first functional control list adjacent to the enclosure, wherein the first functional control list comprises a first windowing control;
displaying the first target element in the first sub-window in response to the first windowing control being triggered; and
receiving a writing operation on the whiteboard application interface, and generating a handwriting, wherein in response to the handwriting overlapping the first sub-window, generating an overlapping part of the handwriting behind the first sub-window, the first sub-window is displayed in a front of the whiteboard application interface, the first sub-window is smaller than the whiteboard application interface, and the overlapping part of the handwriting is displayed only after the first sub-window is removed or the handwriting is moved.

* * * * *